(12) United States Patent
Mouri

(10) Patent No.: US 9,274,268 B2
(45) Date of Patent: Mar. 1, 2016

(54) LIGHTING DEVICE, DISPLAY DEVICE, AND TELEVISION DEVICE

(71) Applicant: Sharp Kabushiki Kaisha, Osaka-shi, Osaka (JP)

(72) Inventor: Hirokazu Mouri, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 167 days.

(21) Appl. No.: 14/356,611

(22) PCT Filed: Dec. 5, 2012

(86) PCT No.: PCT/JP2012/081470
§ 371 (c)(1),
(2) Date: May 7, 2014

(87) PCT Pub. No.: WO2013/089001
PCT Pub. Date: Jun. 20, 2013

(65) Prior Publication Data
US 2015/0098025 A1    Apr. 9, 2015

(30) Foreign Application Priority Data

Dec. 12, 2011  (JP) .................................. 2011-271439

(51) Int. Cl.
| H04N 5/64 | (2006.01) |
| F21V 8/00 | (2006.01) |
| G02F 1/1335 | (2006.01) |

(52) U.S. Cl.
CPC .............. *G02B 6/0083* (2013.01); *G02B 6/009* (2013.01); *G02F 1/133615* (2013.01); *H04N 5/64* (2013.01); *G02B 6/0091* (2013.01); *G02F 2001/133612* (2013.01)

(58) Field of Classification Search
CPC ......... G02B 6/0083; G02B 6/009; H04N 5/64
See application file for complete search history.

(56) References Cited

U.S. PATENT DOCUMENTS

| 8,360,591 B2 | 1/2013 | Jung |
| 8,540,385 B2 | 9/2013 | Naito |
| 2009/0310339 A1 | 12/2009 | Jung |
| 2013/0016498 A1 | 1/2013 | Naito |

FOREIGN PATENT DOCUMENTS

| JP | 2006-351695 A | 12/2006 |
| JP | 2007-035481 A | 2/2007 |
| JP | 2011-525685 A | 9/2011 |
| WO | 2011/125830 A1 | 10/2011 |

OTHER PUBLICATIONS

Official Communication issued in International Patent Application No. PCT/JP2012/081470, mailed on Mar. 12, 2013.

*Primary Examiner* — Elmito Breval
(74) *Attorney, Agent, or Firm* — Keating & Bennett, LLP

(57) ABSTRACT

A back light unit (lighting device) 12 includes an LED (light source) 17, a light guide plate 16 including a light entrance surface 16b and a light exit surface 16a, LED boards 18 each including a plate surface facing the light entrance surface 16b and board relay terminals 22 configured to relay power to the LED 17, and a relay wiring member (relay member) 28 electrically connecting between the board relay terminals 22 and a power source board (power) PWB. The light entrance surface 16b faces the LED 17. The light from the LED 17 enters the light guide plate 16 through the light entrance surface 16b and exits through the light exit surface 16a. The LED 17 is mounted on the plate surface of the LED board 18. The board relay terminals 22 are arranged such that the relay wiring member 28 that is orientated to either one of sides in the thickness direction of the light guide plate 18 is allowed to be connected to the board relay terminals 22.

15 Claims, 28 Drawing Sheets

FIG.16
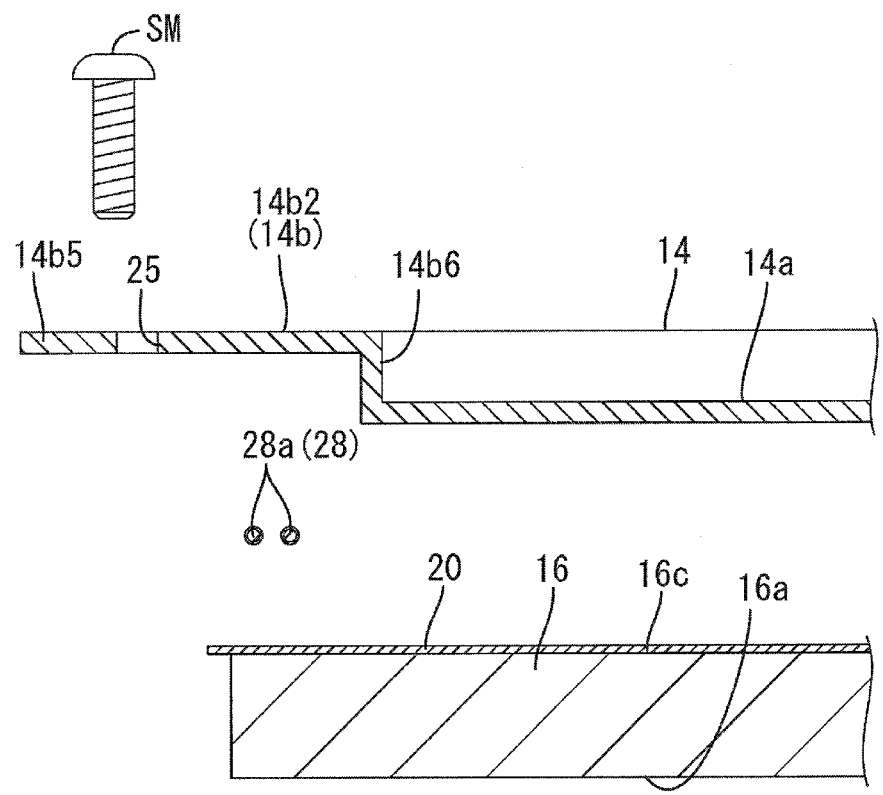
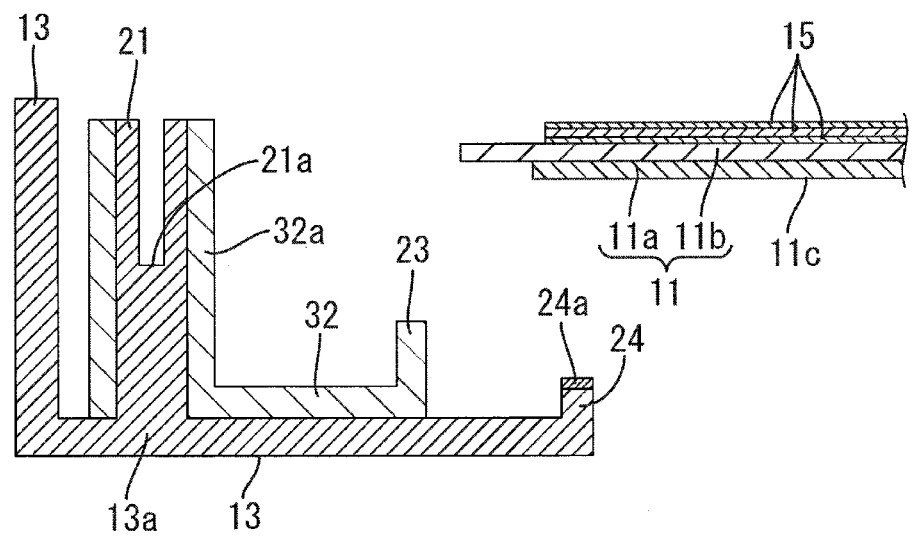
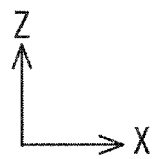

LIGHTING DEVICE, DISPLAY DEVICE, AND TELEVISION DEVICE

TECHNICAL FIELD

The present invention relates to a lighting device, a display device, and a television device.

BACKGROUND ART

In recent years, a display element of an image display device such as a television device is shifting from a conventional CRT display device to a thin display device using a thin display element such as a liquid crystal panel and a plasma display panel. This enables the image display device to have a reduced thickness. A liquid crystal panel used for a liquid crystal display device does not emit light, and thus a backlight unit is required as a separate lighting device. Backlight units can be broadly categorized into two types, i.e. a direct-type backlight unit and an edge-type backlight unit, according to its structure. It is preferable to use the edge-type backlight unit to further reduce the thickness of the liquid crystal display device. Patent Document 1 describes a known edge-type backlight unit. The edge-type backlight unit described in Patent Document 1 includes LEDs as light sources and an LED board on which the LEDs are mounted. The LED board faces a light entrance surface of the light guide plate.

RELATED ART DOCUMENT

Patent Document

Patent Document 1: Japanese Unexamined Patent Publication No. 2006-351695

Problem to be Solved by the Invention

The LED board included in the above-described backlight unit includes a board connector for supplying a power from the power source to an LED. To the board connector, a relay member connector included in a relay wiring member connected to the power source is fitted. In order to reduce the size of a frame of the backlight unit, the relay member connector is fitted to the board connector in a thickness direction of the light guide plate. In order not to block the light from the LED, the board connector, which is a non-light-emission part of the LED board, is positioned on an end of the LED board.

Multiple LED boards each having the above structure may be used in a backlight unit. However, when the relay member connectors are fitted to the board connectors on the LED boards from the same direction, due to the structural restriction of the backlight unit, the LED boards having the same configuration cannot be used in some arrangements of the LED boards with respect to the light guide plate. In such a case, LED boards having different configurations are needed. Increase in the number of kinds of LED board raises the production cost of the LED board and the management cost of various LED boards.

DISCLOSURE OF THE PRESENT INVENTION

The present invention was made in view of the above circumstances. It is an object of the present invention to reduce the production cost.

Means for Solving the Problem

A lighting device according to the present invention includes a light source, a light guide plate including a light entrance surface and a light exit surface, a plurality of light source boards each including a plate surface facing the light entrance surface and board relay terminals configured to relay power to the light source, and a relay member electrically connecting between the board relay terminals and a power. The light entrance surface faces the light source and through which light emitted from the light source enters the light guide plate. The light in the light guide plate exits through the light exit surface. The light source is mounted on the plate surface of each light source board. The board relay terminals are arranged such that the relay member that is orientated to either one of sides in the thickness direction of the light guide plate is allowed to be connected to the board relay terminals.

In this configuration, the light emitted from the light source mounted on the light source boards enters the light guide plate through the light entrance surface thereof and travels inside the light guide plate. Then, the light exits from the light exit surface. The relay member is connected to the board relay terminals included in the light source board to supply the power from the power source to the light source. The board relay terminals are arranged such that the relay member that is orientated to either one of sides in the thickness direction of the light guide plate is allowed to be connected to the board relay terminals. In this configuration, the relay members orientated to the same direction can be connected to the board relay terminals included in each light source board with the light source boards, which has the plate surfaces facing the light entrance surface of the light guide plate, orientated to either direction with respect to the light guide plate. With this configuration, the relay members can be orientated to the same direction for connection, and the number of kinds of light source board can be reduced because the light source boards having the same configuration can be used. Therefore, the production cost can be reduced.

The following configurations may be preferably employed as embodiments of the present invention.

(1) The board relay terminals are arranged on the plate surface of the light source board so as to be symmetric with respect to a rotation center of the relay member. With this configuration, the relay member can be connected to the board relay terminals with the relay member orientated to either side in the thickness direction of the light guide plate, since the board relay terminals are located on the plate surface of the light source board so as to be symmetric with respect to the rotation center of the relay member.

(2) The relay member includes a plurality of relay members. The board relay terminals are connected to the relay members that are all oriented to one side in the thickness direction of the light guide plate. With this configuration, compared to a case in which two different kinds of board relay terminals are provided, the number of board relay terminals can be reduced and an area of the plate surface of the light source board that is occupied by the board relay terminals can be smaller. Two different kinds of board relay terminals include board relay terminals that are arranged such that the relay members orientated to one side in the thickness direction of the light guide plate are connected and board relay terminals that are arranged such that the relay members orientated to the other side in the thickness direction are connected. The above configuration facilitates the reduction in the size of the light source board.

(3) The board relay terminals included in each light source board are arranged such that a line segment connecting the board relay terminals is inclined with respect to the thickness direction of the light guide plate. In this configuration, a distance between the board relay terminals of this configuration is longer than a distance between the board relay terminals that are arranged in the thickness direction of the light guide plate. In the production of the light source board, the board relay terminals of this configuration are less likely to be shorted, and thus a yield rate of the light source boards is improved.

(4) The relay member includes a pair of retainers, and the light source board is sandwiched between the retainers from front and rear sides of the light guide plate. With this configuration, the relay member can be held onto the light source board, since the retainers sandwich the light source board from the front and rear side of the light guide plate.

(5) The plate surface of the light source board and a surface of the relay member facing the light source board include a projection and recess joint. The projection and recess joint includes a protrusion and a recess that fit each other. With this configuration, the relay member can remain connected to the light source board by fitting the protrusion and the recess of the projection and recess joint.

(6) The projection and recess joint includes a plurality of projection and recess joints. The projection and recess joints are provided in the plate surface of the light source board. With this configuration, the relay member hardly rotates against the light source board and the retention can be improved.

(7) The board relay terminals are located on an end of each of the light source boards. At least two of the light source boards are arranged symmetric with respect to a center line of the light guide plate. The center line extends along one of sides of the light guide plate. When the at least two light source boards having the board relay terminals on the end thereof are arranged symmetric with respect to the center line of the light guide plate, the board relay terminals may be arranged such that only the relay member that is orientated to one direction is allowed to be connected. In such a case, two different kinds of light source board need to be provided. However, with the above configuration, only one kind of light source board needs to be provided, since the board relay terminals are arranged such that the relay member that is orientated to either side in the thickness direction of the light source board is allowed to be connected. Therefore, the production cost can be reduced.

(8) At least two of the light source boards are arranged along a side of the light guide plate. The light source boards each include the board relay terminals on the end thereof in a direction along the side of the light guide plate. With this configuration, the relay member connected to the board relay terminals hardly blocks the light emitted from the light source and traveling to the light entrance surface, since the board relay terminals on the light source boards that are arranged along the side of the light guide plate are located on the end of the light source board in the direction along the side of the light guide plate. Therefore, uneven brightness is reduced. Further, the lighting device can have a larger size easily by arranging two or more light source boards along the side of the light guide plate.

(9) The at least two of the light source boards are arranged on opposite sides of the light guide plate such that the light guide plate is disposed therebetween in a direction along a side of the light guide plate. The board relay terminals of one of the light source boards face the board relay terminals of another one of the light source boards with the light guide plate therebetween. In this configuration, the relay members that are connected to the board relay terminals are all located on one side of the light guide plate, since the board relay terminals on one of the light source boards, which are arranged on opposite sides of the light guide plate such that the light guide plate is disposed therebetween in the direction along the side of the light guide plate, face the board relay terminals of another one of the light source boards with the light guide plate therebetween. This configuration facilitates the connection of the relay members to the power source.

(10) The light source board includes the board relay terminals on the plate surface thereof on which the light source is mounted. The light guide plate includes a relay member through recess. The relay member through recess is a cutout through which the relay member connected to the board relay terminals passes. In this configuration, the relay member connected to the board relay terminals, which are on the plate surface of the light source board on which the light source is mounted, passes through the relay member through recess that is the cutout formed in the light guide plate. Thus, a distance between the light source on the light source board and the light entrance surface of the light guide plate can be short compared to a configuration in which the light guide plate does not include the relay member through recess. This improves light entrance efficiency of the light that emitted from the light source to the light entrance surface. Therefore, the brightness can be improved or the power consumption can be reduced.

(11) The relay member through recess is the cutout at a corner of the light guide plate. With this configuration, the size of the light guide plate can be minimized, and thus the frame of the lighting device can have a smaller size, since the relay member through recess is the cutout at a corner of the light guide plate.

(12) The lighting device further includes the chassis that houses the light source board and the light guide plate. The chassis is arranged such that the surface thereof facing the light guide plate and the light source board is located on the side opposite to the light exit surface. The power is arranged outside the chassis. The relay member is connected to the board relay terminals from the chassis side. With this configuration, the relay members can be easily connected to the power and the board relay terminals, since the relay members that are connected to the power, which is located outside the chassis, are connected to the board relay terminals from the chassis side.

To solve the above problem, a display device according to the present invention includes the above-described lighting device and a display panel configured to provide display using light from the lighting device.

In the display device, the lighting device that is configured to supply light to the display panel is produced at a lower cost, and thus the production cost of the display device can be reduced.

An example of the display panel is a liquid crystal panel. Such a display device has a variety of applications such as a display of a television or a computer. Particularly, it is suitable for a large screen display.

Advantageous Effect of the Invention

According to the present invention, the production cost can be reduced.

BRIEF DESCRIPTION OF THE DRAWINGS

FIG. 16 is a cross-sectional view illustrating a cross-sectional configuration of the liquid crystal display device taken in the long-side direction. The view illustrates an assembly procedure of the components included in the liquid crystal display unit that constitutes the liquid crystal display device.

MODE FOR CARRYING OUT THE INVENTION

First Embodiment

A first embodiment of the present invention will be described with reference to FIG. 1 to FIG. 17. In this embodiment, a liquid crystal display device 10 will be described as an example. An X-axis, a Y-axis, and a Z-axis are indicated in some drawings. The axes in each drawing correspond to the respective axes in other drawings. An upper side and a lower side in FIG. 4 correspond to a front side and a rear side, respectively.

Figure 1:
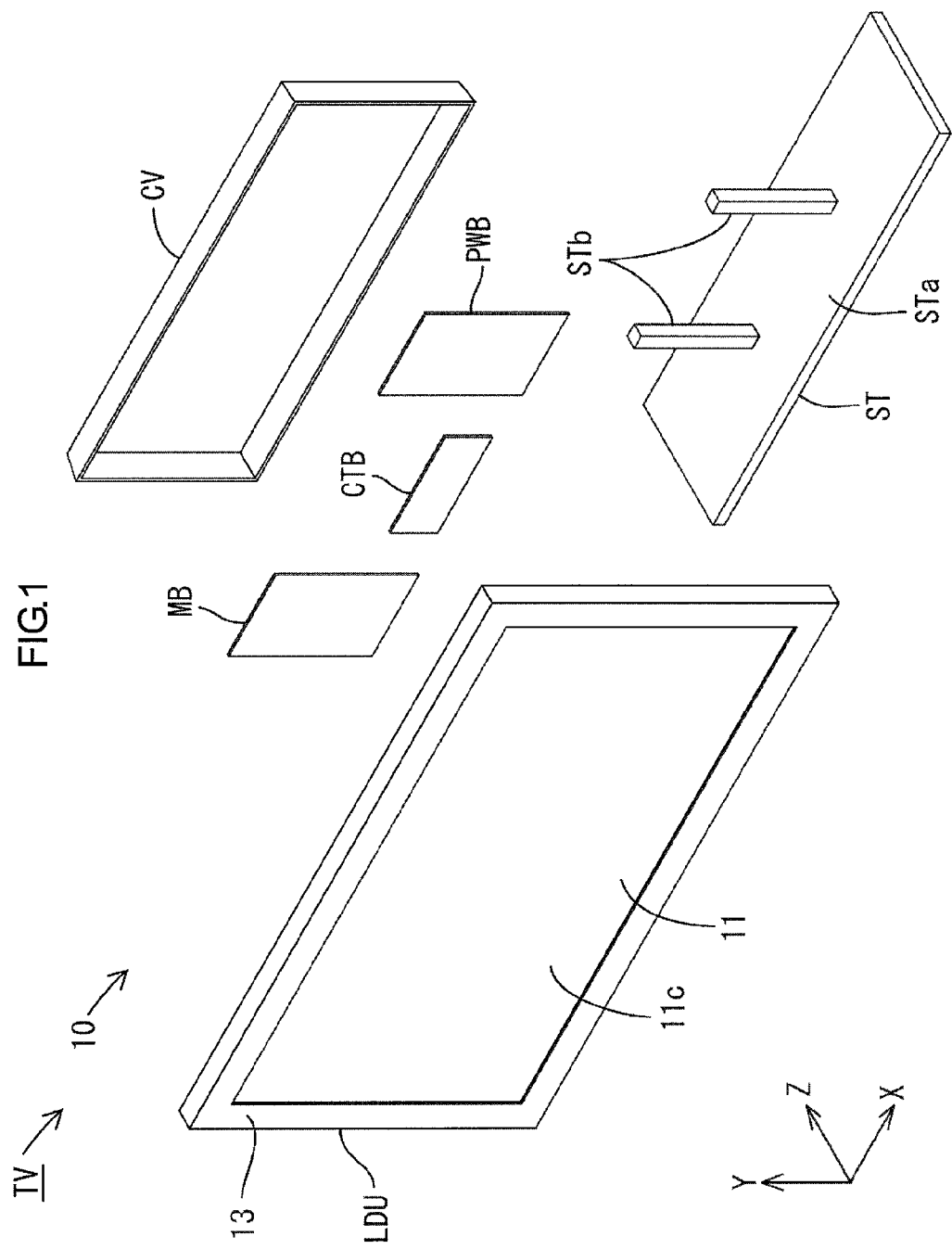
FIG. 1 is an exploded perspective view illustrating a general configuration of a television device and a liquid crystal display device according to a first embodiment of the present invention.
Figure 3:
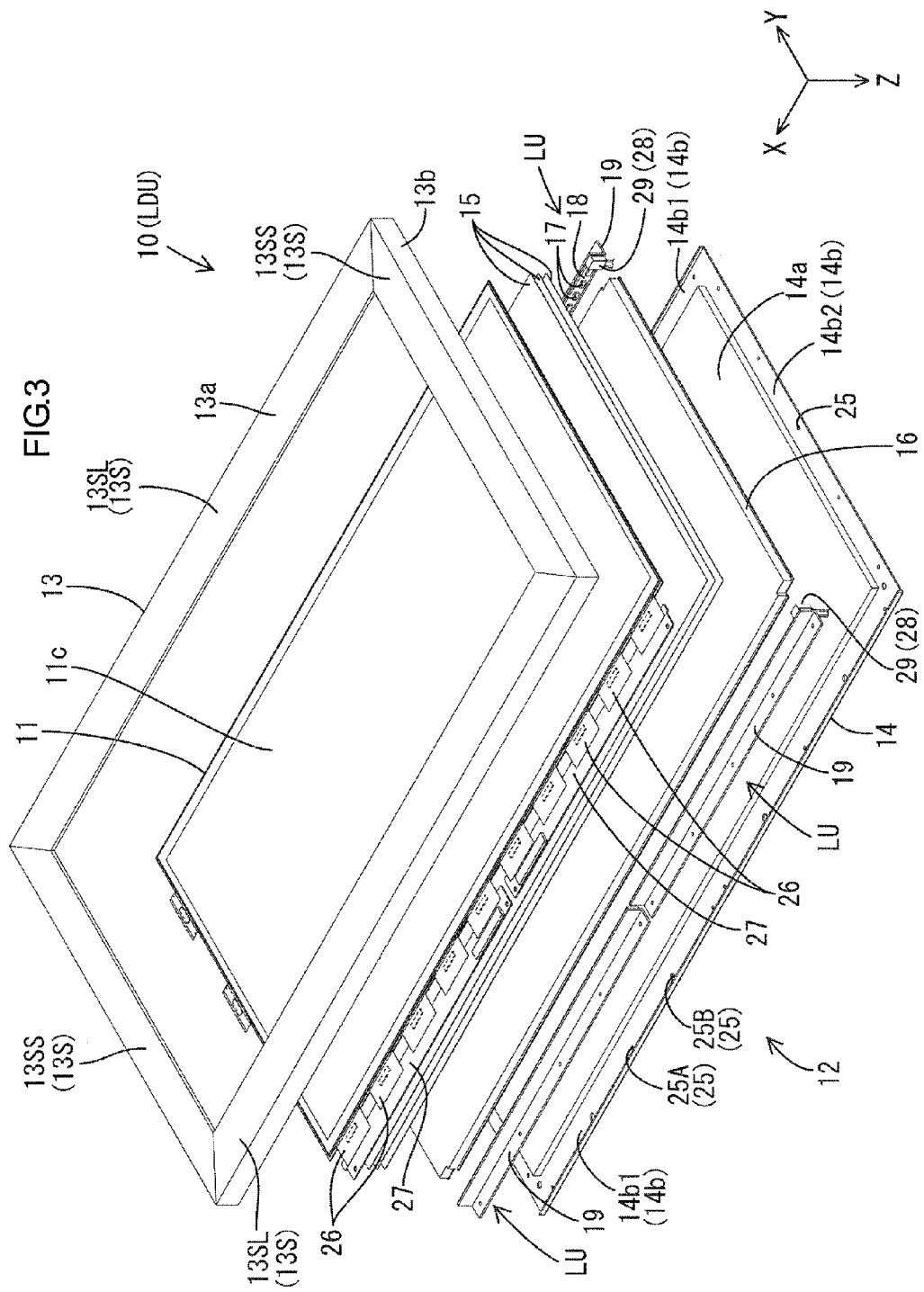
FIG. 3 is an exploded perspective view illustrating a general configuration of a liquid crystal display unit included in the liquid crystal display device.

As illustrated in FIG. 1, a television device TV according to this embodiment includes a liquid crystal display unit (a display unit) LDU, boards PWB, MB, and CTB, a cover CV, and a stand ST. The boards PWB, MB, and CTB are attached on a rear surface (a back surface) of the liquid crystal display unit LDU. The cover CV is attached on a rear surface side of the liquid crystal display device 10 so as to cover the boards PWB, MB, and CTB. The stand ST supports the liquid crystal display unit LDU such that a display surface of the liquid crystal display unit LDU extends in the vertical direction (the Y-axis direction). The liquid crystal display device 10 according to this embodiment has the same configuration as the television device TV except for at least a component for receiving television signals (e.g. a tuner included in the main board MB). As illustrated in FIG. 3, the liquid crystal display unit LDU has a landscape rectangular shape (a rectangular shape, a longitudinal shape) as a whole. The liquid crystal display unit LDU includes a liquid crystal panel 11 as a display panel and a backlight unit (a lighting device) 12 as an external light source. The liquid crystal display device 10 includes a frame (a holding portion arranged on the display 11c side, one holding portion) 13 and a chassis (a holding portion on the side opposite to the display 11c side, another holding portion) 14 as exterior members that provide an appearance of the liquid crystal display device 10. The frame 13 and the chassis 14 hold the liquid crystal panel 11 and the backlight unit 12. In other words, the frame 13 and the chassis 14 constitute a holding member. The chassis 14 according to this embodiment is not only a part of the exterior member or the holding member but also a part of the backlight unit 12.

Figure 2:
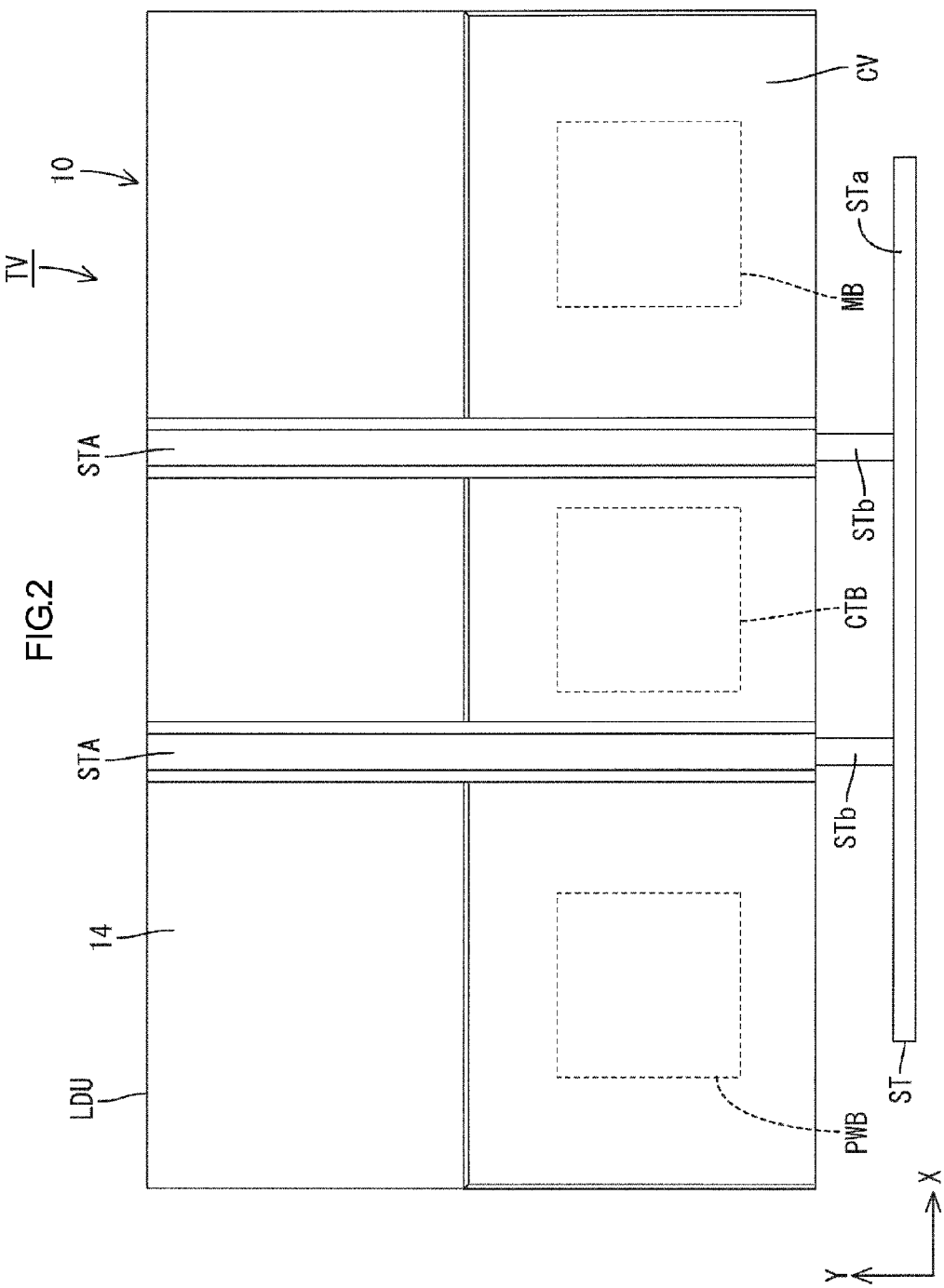
FIG. 2 is a rear view of the television device and the liquid crystal display device.

Configuration of the liquid crystal display device 10 on the rear surface side will be described. As illustrated in FIG. 2, two stand attachments STA are attached to a rear surface of the chassis 14. The rear surface of the chassis 14 provides a rear appearance of the liquid crystal display device 10. The stand attachments STA are away from each other in the X-axis direction and extend along the Y-axis direction on the chassis 14. Each stand attachment STA has a substantially channel-shaped cross section and is open to the chassis 14 so as to form a space with the chassis 14. Support portions STb of the stand ST are each inserted in the space between the respective stand attachments STA and the chassis 14. The stand ST includes a base STa and the support portions STb. The base STa extends parallel to the X-Z plane. The support portions STb stand on the base STa in the Y-axis direction. The cover CV is made of synthetic resin and attached to a part of the rear surface of the chassis 14. Specifically, as illustrated in FIG. 2, the cover CV covers a lower half part of the chassis 14 so as to cross over the stand attachments STA in the X-axis direction. A component storage space is provided between the cover CV and the chassis 14 such that the boards PWB, MB, and CTB, which will be described next, are stored therein.

As illustrated in FIG. 2, the boards PWB, MB, and CTB include a power source board PWB, a main board MB, and a control board CTB. The power source board PWB is a power supply source of the liquid crystal display device 10 and thus supplies drive power to the other boards MB and CTB and to LEDs 17 of the backlight unit 12. In other words, the power source board PWB also serves as "an LED drive board (a light source driving board, a power source) that drives the LEDs 17". The main board MB includes at least a tuner and an image processor, which are not illustrated. The tuner is configured to receive television signals. The image processor performs image processing on the received television signals. The main board MB is configured to output the processed image signals to the control board CTB, which will be described later. If an external image reproducing device, which is not illustrated, is connected to the liquid crystal display device 10, image signals from the image reproducing device are input to the main board MB. The image processor included in the main board MB processes the image signals, and the main board MB outputs the processed image signals to the control board CTB. The control board CTB is configured to convert the image signals, which are sent from the main board MB, to driving signals for liquid crystals and to supply the driving signals to the liquid crystal panel 11.

As illustrated in FIG. 3, main components of the liquid crystal display unit LDU included in the liquid crystal display device 10 are arranged in a space between the frame (a front frame) 13, which provides a front appearance, and the chassis (a rear chassis) 14, which provides a rear appearance. The main components housed in the space between the frame 13 and the chassis 14 include at least the liquid crystal panel 11, optical members 15, a light guide plate 16, and LED units (light source units) LU. The liquid crystal panel 11, the optical members 15, and the light guide plate 16 are placed on top of one another and held between the frame 13 on the front side and the chassis 14 on the rear side. The backlight unit 12 includes the optical members 15, the light guide plate 16, the LED units LU, and the chassis 14. In other words, the liquid crystal display unit LDU without the liquid crystal panel 11 and the frame 13 is the backlight unit 12. The LED units LU included in the backlight unit 12 are arranged along long-side ends (the X-axis direction) of the light guide plate 16 in the space between the frame 13 and the chassis 14. Specifically, two pairs of the LED units LU, four in total, sandwich the light guide plate 16 from each end in a short-side direction (the Y-axis direction) of the light guide plate 16. The LED unit LU each include LEDs 17 as light sources, the LED board (a light source board) 18 on which the LEDs 17 are mounted, and a heat dissipation member (a heat spreader, a light source attachment portion) 19 to which the LED board 18 is attached. Each component will be described next.

Figure 4:
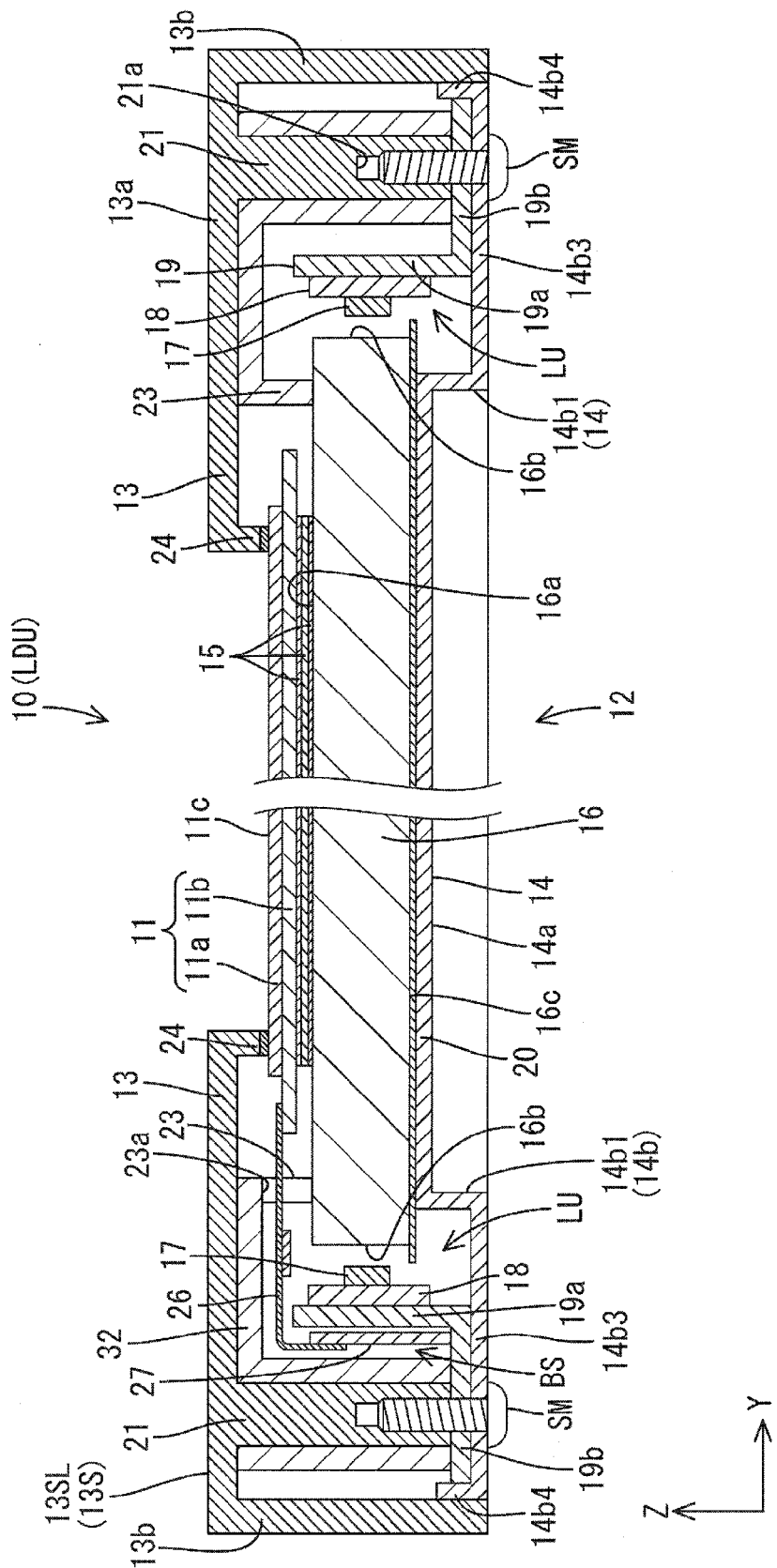
FIG. 4 is a cross-sectional view of the liquid crystal display device taken in a short-side direction thereof.
Figure 5:
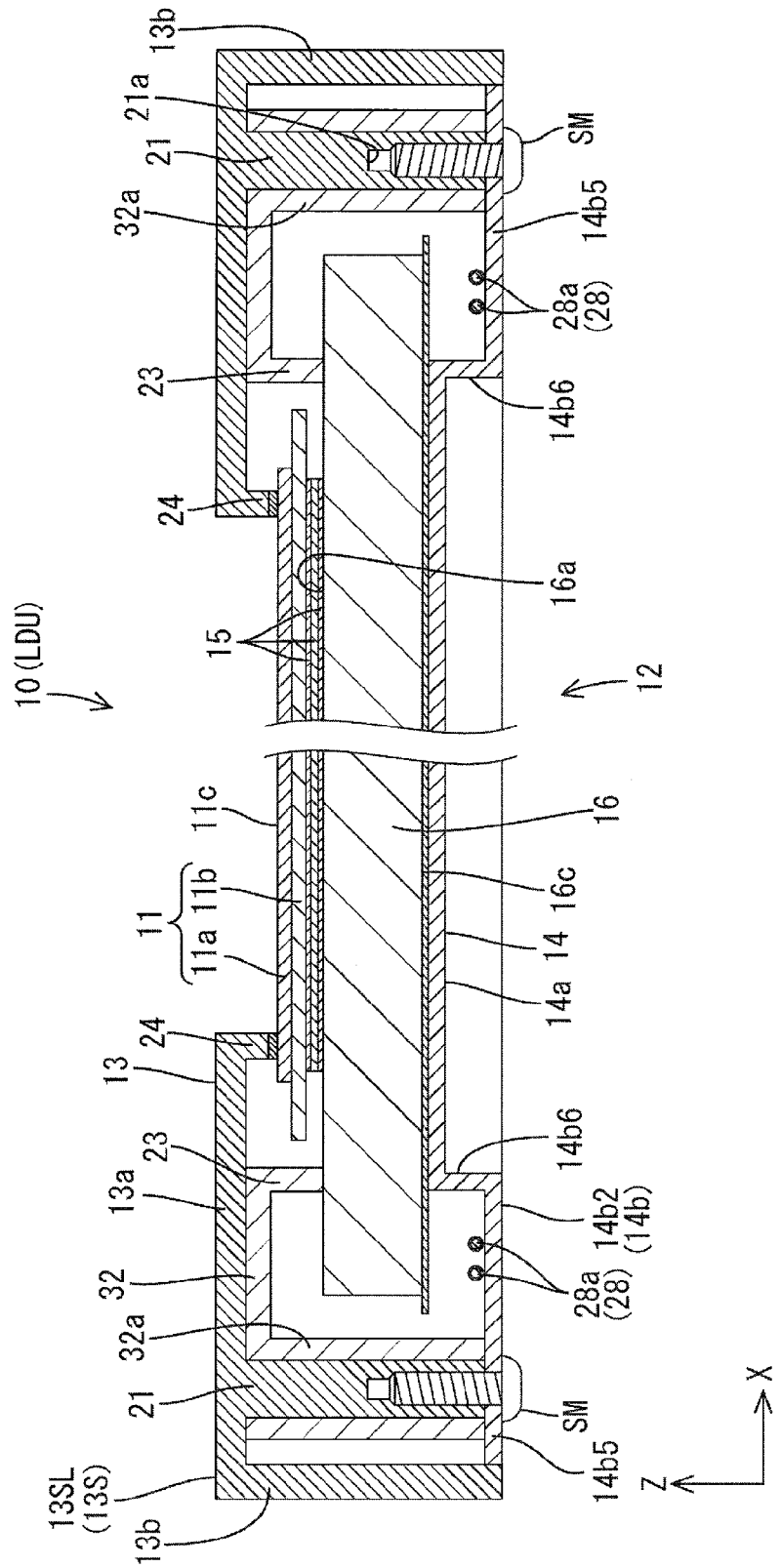
FIG. 5 is a cross-sectional view of the liquid crystal display device taken in a long-side direction thereof.

As illustrated in FIG. 3, the liquid crystal panel 11 has a landscape rectangular shape (a rectangular shape, a longitudinal shape) in a plan view. As illustrated in FIG. 4 and FIG. 5, the liquid crystal panel 11 includes a pair of glass substrates 11a and 11b and liquid crystals. The substrates 11a and 11b each having high light transmission properties are bonded together with a predetermined gap therebetween. The liquid crystals are sealed between the substrates 11a and 11b. One of the substrates 11a and 11b that is on the front side is a CF substrate 11a and the other one of the substrates 11a and 11b that is on the rear side (on the backside) is an array substrate 11b. On the array substrate 11b, switching elements (e.g. TFTs), pixel electrodes, and an alignment film are arranged. The switching elements are connected to gate lines and source lines that are arranged perpendicular to each other. The pixel electrodes are connected to the switching elements. On the CF substrate 11a, color filters, a counter electrode, and an alignment film are arranged. The color filters include red (R), green (G), and blue (B) color portions that are arranged in a predetermined arrangement. Polarizing plates, which are not illustrated, are arranged on outer sides of the substrates 11a and 11b.

As illustrated in FIG. 4 and FIG. 5, the array substrate 11b, which is one of the substrates 11a, 11b included in the liquid crystal panel 11, has a larger size than the CF substrate 11a in a plan view and is arranged such that ends of the array substrate 11b are located outwardly of the CF substrate 11a. Specifically, the array substrate 11b is slightly larger than the CF substrates 11a such that an entire outer peripheral part thereof protrudes outwardly from an outer peripheral end of the CF substrate 11a. Terminals extended from the gate lines and the source lines are provided on one of long-side ends of the array substrate 11b. The one of the long-side ends of the array substrate 11b is on the control board CTB side in the Y-axis direction (the left end in FIG. 4). As illustrated in FIG. 2 and FIG. 4, flexible boards (FPC boards) 26 each including a driver DR for controlling liquid crystals are connected to the respective terminals. The flexible boards 26 are apart from each other in the X-axis direction, that is, a direction along the long-side end of the array substrate 11b. Each flexible board 26 protrudes from the long-side end of the array substrate 11b to the outside in the Y-axis direction. The flexible board 26 includes a film-like base and wiring patterns (not illustrated) on the film-like base. The film-like base is made of synthetic resins (such as polyimide resins) that have insulation property and flexibility. The wiring patterns are connected to the driver DR mounted on about the center of the base. One end of each flexible board 26 is press-connected to each terminal of the array substrate 11b via an anisotropic conductive film (ACF). Another end of each flexible board 26 is press-connected to each terminal of a printed circuit board 27 via another anisotropic conductive film. The printed circuit board 27 will be described later. The printed circuit board 27 is connected to the control board CTB via a wiring member, which is not illustrated, and configured to transmit signals from the control board CTB to the flexible boards 26. The liquid crystal panel 11 thus displays images on the display surface 11c according to the signals from the control board CTB.

As illustrated in FIG. 4 and FIG. 5, the liquid crystal panel 11 is placed on a front side (a light exit side) of the optical members 15, which will be described later. A rear surface of the liquid crystal panel 11 (a rear surface of the polarizing plate) is fitted to the optical member 15 with minimal gaps therebetween. Therefore, dust hardly enters between the liquid crystal panel 11 and the optical member 15. The display surface 11c of the liquid crystal panel 11 includes a display area and a non-display area. The display area is an inner area of a screen in which images are displayed. The non-display area is an outer area of the screen around the display area with a frame-like shape. The terminals and the flexible boards 26 described above are arranged in the non-display area.

As illustrated in FIG. 3, each optical member 15 has a landscape rectangular shape in a plan view like the liquid crystal panel 11 and has about the same size (a short-side dimension and a long-side dimension) as the liquid crystal panel 11. The optical members 15 are placed on the front side (the light exit side) of the light guide plate 16, which will be described later, and sandwiched between the light guide plate 16 and the liquid crystal panel 11. Three optical members 15 each having a sheet-like shape are placed on top of one another. Each of the optical members 15 may be any one selected from a diffuser sheet, a lens sheet, and a reflecting type polarizing sheet.

The light guide plate 16 is made of a substantially transparent (high light transmissive) synthetic resin (e.g. acrylic resin or polycarbonate such as PMMA) which has a refractive index sufficiently higher than that of the air. As illustrated in FIG. 3, the light guide plate 16 has a landscape rectangular shape in a plan view like the liquid crystal panel 11 and the optical members 15. A thickness of the light guide plate 16 is larger than a total thickness of the optical members 15. A long-side direction and a short-side direction of a main surface (a plate surface) of the light guide plate 16 correspond to the X-axis direction and the Y-axis direction, respectively. A thickness direction of the light guide plate 16 that is perpendicular to the main surface corresponds to the Z-axis direction (an overlapping direction of the liquid crystal panel 11 and the light guide plate 16). The light guide plate 16 is arranged on the rear side of the optical members 15 and sandwiched between the optical members 15 and the chassis 14. As illustrated in FIG. 4 and FIG. 5, a short-side dimension and a long-side dimension of the light guide plate 16 is larger than those of the liquid crystal panel 11 and the optical members 15. The light guide plate 16 is arranged such that ends thereof along four sides are located outwardly of the ends along four sides of each of the liquid crystal panel 11 and the optical members 15 (so as not to overlap each other in a plan view). With this configuration, the light from the LED 17 can travel sufficient distance inside the light guide plate 16. The ends of the light guide plate 16 from which the light may unevenly exit compared to the middle section thereof can be located outside the display area of the liquid crystal panel 11. The LED units LU are arranged on each side in the short-side direction so as to have the light guide plate 16 therebetween in the Y-axis direction. The light from the LEDs 17 enters the light guide plate 16 through the ends in the short-side direction. The light guide plate 16 is configured to allow the light, which is emitted from the LEDs 17 and entered through the ends of the light guide plate 16 in the short-side direction, to travel therethrough and guide the light to the optical member 15 (the front side).

As illustrated in FIG. 4, one of the main surfaces of the light guide plate 16 that faces the front (a surface facing the optical members 15) is a light exit surface 16a. Light exits from the light guide plate 16 through the light exit surface 16a toward the optical members 15 and the liquid crystal panel 11. Outer end surfaces of the light guide plate 16 that are adjacent to the main surfaces thereof include elongated long-side surfaces (end surfaces in the short-side direction) that extend in the X-axis direction. The long-side surfaces are each face the LEDs 17 (the LED boards 18) with a predetermined distance therebetween and serve as light entrance surfaces 16b through which light from LEDs 17 enters. The light entrance surfaces 16b are parallel to the X-Z plane (main surfaces of the LED boards 18) and substantially perpendicular to the light exit surface 16a. An arrangement direction of the LED 17 and the light entrance surface 16b correspond to the Y-axis direction and parallel to the light exit surface 16a.

As illustrated in FIG. 4 and FIG. 5, a light guide reflection sheet (a reflection member) 20 is arranged on a rear side of the light guide plate 16, i.e., a surface 16c opposite to the light exit surface 16a (a surface facing the chassis 14). Light that travels from the surface 16c toward the rear outside is reflected by the light guide reflection sheet 20 toward the front. The light guide reflection sheet 20 is arranged to cover an entire area of the surface 16c. In other words, the light guide reflection sheet 20 is arranged between the chassis 14 and the light guide plate 16. The light guide reflection sheet 20 is made of synthetic resin and has a white surface having high light reflectivity. As illustrated in FIG. 4 and FIG. 5, the light guide reflection sheet 20 has a short-side dimension and a long-side dimension larger than those of the light guide plate 16. The light guide reflection sheet 20 is arranged such that ends of four sides thereof protrude outwardly from the ends of four sides of the light guide plate 16. Particularly, as illustrated in FIG. 4, the long-side ends of the light guide reflection sheet 20 protrudes from the light entrance surfaces 16b of the light guide plate 16 toward the LEDs 17. The protruded portions (the long-side ends) of the light guide reflection sheet 20 effectively reflects light traveling from the LEDs 17 toward the chassis 14 at an angle toward the light entrance surfaces 16b of the light guide plate 16. At least one of the light exit surface 16a and the surface 16c opposite to the light exit surface 16a of the light guide plate 16 has a reflection portion (not illustrated) or a scattering portion (not illustrated). The reflection portion is configured to reflect the light inside the light guide plate 16. The scattering portion (not illustrated) is configured to scatter the light inside the light guide plate 16. The reflection portion or the scattering portion may be formed by patterning so as to have a specified in-plane distribution. This configuration regulates the light from the light exit surface 16a to have an even in-plane distribution.

Next, a configuration of each of the LEDs 17, the LED board 18, and the heat dissipation member 19, which are included in the LED unit LU, will be described. As illustrated in FIG. 3 and FIG. 4, the LEDs 17, which are included in the LED unit LU, each include an LED chip that is sealed with resin on a board fixed on the LED board 18. The LED chip mounted on the board has one main light emission wavelength. Specifically, the LED chip that emits light in a single color of blue is used. On the other hand, the resin that seals the LED chip contains phosphors dispersed therein. The phosphors emit light in a predetermined color when excited by blue light emitted from the LED chip. Overall color of light emitted from the LED 17 is white. The phosphors may be selected, as appropriate, from yellow phosphors that emit yellow light, green phosphors that emit green light, and red phosphors that emit red light. The phosphors may be used alone or in combination of the above phosphors. The LED 17 includes a main light-emitting-surface 17a that is opposite to a surface on which the LED board 18 is mounted (a surface facing the light entrance surface 16b of the light guide plate 16). Namely, the LED 17 is a top-surface-emitting type LED (see FIG. 6 for the main light-emitting-surface 17a).

Figure 12:
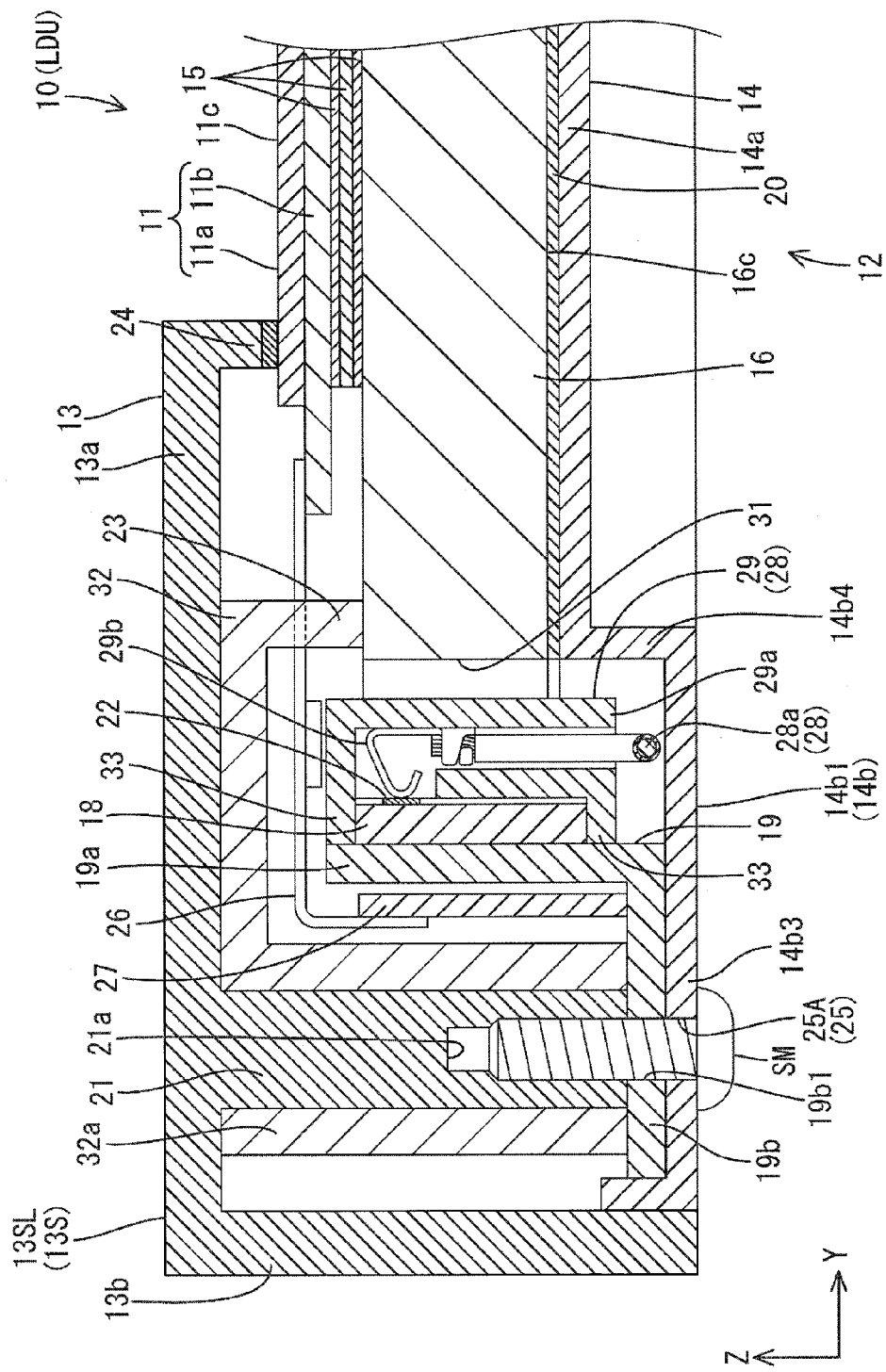
FIG. 12 is a cross-sectional view taken along a line xii-xii in FIG. 10.

As illustrated in FIG. 3 and FIG. 4, each LED board 18 included in the LED unit LU has an elongated plate-like shape and extends in the long-side direction of the light guide plate 16 (the X-axis direction, the long-side direction of the light entrance surface 16b). The LED boards 18 are placed in the space between the frame 13 and the chassis 14 such that a main board surface of each LED board 18 is parallel to the X-Z plane, i.e., parallel to the light entrance surface 16*b* of the light guide plate 16. Each LED board 18 has a long-side dimension that is about a half of the long-side dimension of the light guide plate 16. The LED board 18 includes a mount surface 18*a* on which the LEDs 17 are mounted. The mount surface 18*a* is a main board surface that faces inward, i.e., a surface that faces the light guide plate 16 (the surface opposed to the light guide plate 16) (see FIG. 6 for the mount surface 18*a*). The LEDs 17 are arranged in a line (i.e., linearly) at intervals on the mount surface 18*a* of the LED board 18 along the long-side direction of the LED board 18 (the X-axis direction). In other words, multiple LEDs 17 are arranged away from each other in the long-side direction on the ends along the long side of the backlight unit 12. Distances between the adjacent LEDs 17 in the X-axis direction are substantially equal, that is, the LEDs 17 are arranged at substantially equal intervals. Wiring patterns (not illustrated) are formed on the mount surface 18*a* of the LED board 18. The wiring patterns extend in the longitudinal direction (the X-axis direction) of the LED board 18 and extend in the arrangement direction of the LEDs 17 so as to be connected to the LEDs 17. At ends of the wiring patterns, board relay terminals 22 are formed (FIG. 12). To each of the board relay terminals 22, a relay wiring connector (a relay member 28) is connected to relay the power from the power source board PWB. A configuration and an arrangement of the board relay terminals 22 and the relay wiring member 28 will be described in detail later. Two of the LED boards 18 that are arranged with the light guide plate 16 therebetween are placed in the space between the frame 13 and the chassis 14 such that the mount surfaces 18*a* on which the LEDs 17 are mounted face each other. The main light-emitting-surfaces 17*a* of the LEDs on one of the LED boards 18 face the main light-emitting-surfaces 17*a* of the LEDs 17 on the other one of the LED boards 18. A light axis of each LED 17 substantially corresponds to the Y-axis direction. The LED board 18 is made of metal such as aluminum. Wiring patterns (not illustrated) are formed on the surface of the LED board 18 via an insulating layer. The LED board 18 may be made of an insulating material such as ceramic.

As illustrated in FIG. 3 and FIG. 4, the heat dissipation member 19 included in each LED unit LU is made of metal having high thermal conductivity, e.g. aluminum. The heat dissipation member 19 includes an LED attachment portion (a light source attachment portion) 19*a* and a heat dissipation portion 19*b*. The LED board 18 is attached on the LED attachment portion 19*a*. The heat dissipation portion 19*b* is in plane-contact with a plate surface of the chassis 14. The LED attachment portion 19*a* and the heat dissipation portion 19*b* form an angle therebetween so as to have an L-like shape in a cross-section. The heat dissipation member 19 has a long-side dimension substantially equal to the long-side dimension of the LED board 18. The LED attachment portion 19*a* of the heat dissipation member 19 has a plate-like shape and arranged parallel to the plate surface of the LED board 18 and the light entrance surface 16*b* of the light guide plate 16. A long-side direction, a short-side direction, and a thickness direction of the LED attachment portion 19*a* correspond to the X-axis direction, the Z-axis direction, and the Y-axis direction, respectively. The LED board 18 is mounted on an inner surface of the LED attachment portion 19*a*, i.e., a plate surface that faces the light guide plate 16. While the LED attachment portion 19*a* has a long-side dimension that is substantially equal to that of the LED board 18, a short-side dimension of the LED attachment portion 19*a* is larger than that of the LED board 18. Therefore, ends of the LED attachment portion 19*b* in the short-side direction are located outwardly of the LED board 18 in the Z-axis direction. An outer plate surface of the LED attachment portion 19*a*, i.e., a plate surface opposite to the plate surface on which the LED board 18 is attached, faces a screw attachment portion 21 (a fixing member attachment portion) included in the frame 13, which will be describes later. The LED attachment portion 19*a* is located between the screw attachment portion 21 of the frame 13 and the light guide plate 16. The LED attachment portion 19*a* rises from an inner end of the heat dissipation portion 19*b*, i.e., an end of the heat dissipation portion 19*b* on the LEDs 17 (the light guide plate 16) side, toward the front side in the Z-axis direction (a direction in which the liquid crystal panel 11, the optical members 15, and the light guide plate 16 overlap each other), i.e., toward the frame 13.

As illustrated in FIG. 3 and FIG. 4, the heat dissipation portion 19*b* has a plate-like shape and is parallel to the plate surface of the chassis 14. A long-side direction, a short-side direction, and a thickness direction of the heat dissipation portion 19*b* correspond to the X-axis direction, the Y-axis direction, and the Z-axis direction, respectively. The heat dissipation portion 19*b* extends from a rear-side end of the LED attachment portion 19*a* toward outside in the Y-axis direction, i.e., toward the side opposite to the LED attachment portion 19*a*. The heat dissipation portion 19*b* has a long-side dimension substantially equal to the long-side dimension of the LED attachment portion 19*a*. An entire rear plate surface of the heat dissipation portion 19*b*, i.e., a plate surface facing the chassis 14, is in contact with the plate surface of the chassis 14. An entire front plate surface of the heat dissipation portion 19*b*, i.e., a plate surface opposite to the surface in contact with the chassis 14, faces the screw attachment portion 21 of the frame 13, which will be described later. Specifically, the front plate surface of the heat dissipation portion 19*b* is in contact with a distal end surface of the screw attachment portion 21. The heat dissipation portion 19*b* is sandwiched between the screw attachment portion 21 of the frame 13 and the chassis 14. With this configuration, heat generated by the lighted LEDs 17 is transferred to the chassis 14 and the frame 13 including the screw attachment portion 21 via the LED board 18, the LED attachment portion 19*a*, and the heat dissipation portion 19*b*. Therefore, the heat is effectively released to the outside of the liquid crystal display device 10 and thus the heat is less likely to be stayed therein. The heat dissipation portion 19*b* includes a through hole 19*b*1 through which a screw member (a fixing member) SM is passed. The heat dissipation portion 19*b* is fixed to the screw attachment portion 21 with the screw member SM (see FIG. 6 for the through hole 19*b*1).

Next, configurations of the frame 13 and the chassis 14, which constitute the exterior member and the holding member, will be described. The frame 13 and the chassis 14 are made of metal such as aluminum so as to have high mechanical strength (rigidity) and high thermal conductivity compared to a frame and a chassis that are made of synthetic resin. As illustrated in FIG. 3, the frame 13 and the chassis 14 hold the liquid crystal panel 11, the optical members 15, and the light guide plate 16, which are placed on top of the other, from the front side and the rear side with the LED units LU that are arranged on each end in the short-side direction (the long-side ends) housed in the space between the frame 13 and the chassis 14.

As illustrated in FIG. 3, the frame 13 has a landscape rectangular shape so as to surround the display area of the display surface 11*c* of the liquid crystal panel 11. The frame 13 includes a panel holding portion 13*a* and a side wall 13*b*.

The panel holding portion 13a is parallel to the display surface 11c of the liquid crystal panel 11 and presses the liquid crystal panel 11 from the front side. The side wall 13b protrudes from an outer periphery of the panel holding portion 13a toward the rear side. The panel holding portion 13a and the side wall 13b form an L-like shape in a cross-section. The panel holding portion 13a has a landscape-rectangular and frame-like shape as a whole that corresponds to an outer peripheral portion (the non-display area, the frame-like portion) of the liquid crystal panel 11. The panel holding portion 13a can press a substantially entire area of the outer peripheral portion of the liquid crystal panel 11 from the front side. The panel holding portion 13a has a width that is large enough to cover not only the outer peripheral portion of the liquid crystal panel 11 but also the outer peripheral portions of the optical members 15 and the light guide plate 16 and the LED units LU from the front side. The outer peripheral portions of the optical members 15 and the light guide plate 16 and the LED units LU are located radially outward of the outer peripheral portion of the liquid crystal panel 11. Like the display surface 11c of the liquid crystal panel 11, a front outer surface (a surface opposite to the surface facing the liquid crystal panel 11) of the panel holding portion 13a is exposed to the outside from the front side of the liquid crystal display device 10. The panel holding portion 13a constitutes a front surface of the liquid crystal display device 10 together with the display surface 11c of the liquid crystal panel 11. The side wall 13b has a substantially rectangular hollow shape and protrudes from the outer peripheral portion (specifically, the outer peripheral edge) of the panel holding portion 13a toward the rear side. The side wall 13b surrounds the liquid crystal panel 11, the optical members 15, the light guide plate 16, and the LED units LU, which are placed in the space between the frame 13 and the chassis 14, entirely in the peripheral direction. The side wall 13b also surrounds the chassis 14, which is on the rear side, entirely in the peripheral direction. Outer surfaces of the side wall 13b that extend in a peripheral direction of the liquid crystal display device 10 are exposed to the outside of the liquid crystal display device 10. Therefore, the outer surfaces of the side walls 13b provide a top surface, a bottom surface, and side surfaces of the liquid crystal display device 10.

Figure 8:
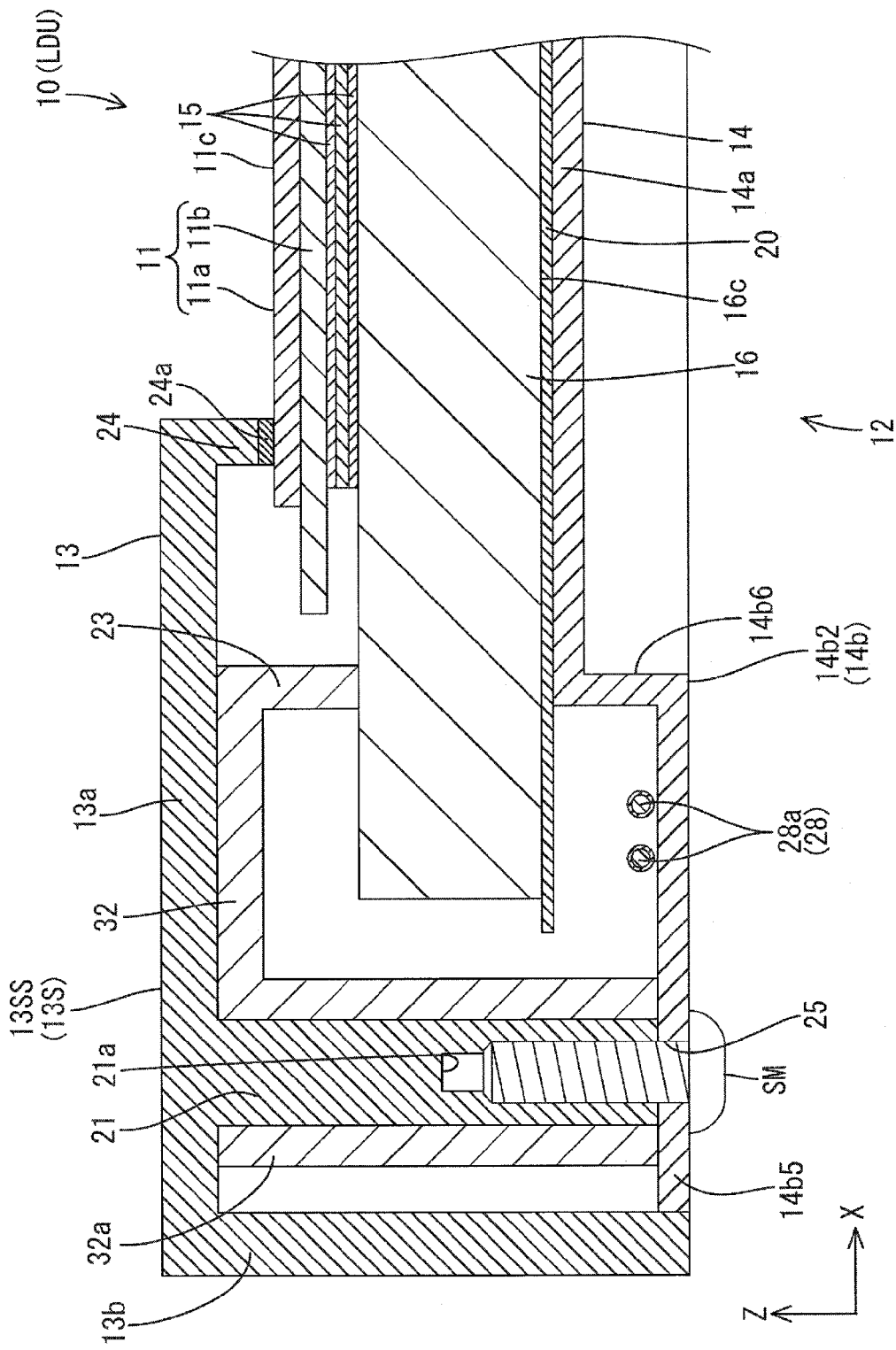
FIG. 8 is a magnified view of the cross-sectional view in FIG. 5.
Figure 9:
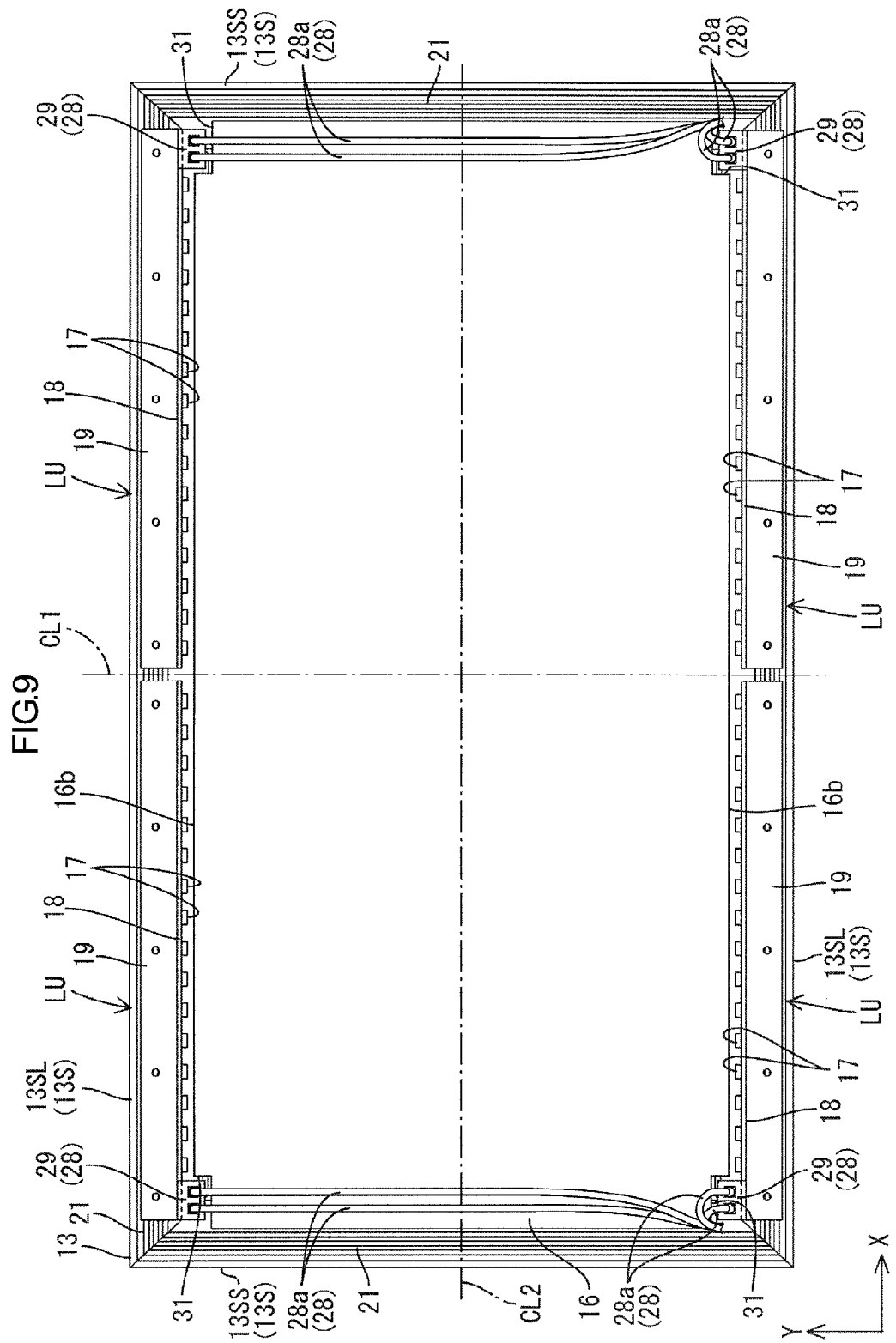
FIG. 9 is a rear view of the liquid crystal display device. The chassis is not illustrated.

As illustrated in FIG. 3 and FIG. 9, the frame 13 formed in a frame-like shape with the above basic configuration includes four frame pieces 13S that are assembled together. The frame pieces 13S (long-side portions and short-side portions) each correspond to each side of the frame 13. Specifically, the frame pieces 13S include long-side frame pieces 13SL and short-side frame pieces 13SS that constitute the long-side portions and the short-side portions of the frame 13 (the panel holding portions 13a and the side walls 13b), respectively. Each long-side frame piece 13SL is a block member that extends in the X-axis direction and has an L-like cross section. Each short-side frame piece 13SS is a block member that extends in the Y-axis direction and has an L-like cross section. With this configuration, in the production process, the frame pieces 13S can be formed by extruding metal material, for example. Thus, the production cost can be reduced compared to the frame 13 formed by cutting metal material. The long-side frame pieces 13SL and the short-side frame pieces 13SS that are adjacent to each other form the frame 13 by joining the respective edges thereof in the respective extending directions. The edges of the long-side frame pieces 13SL and the edges of the short-side frame pieces 13SS, which are the joint portions of the frame pieces 13SL and 13SS (joints in the frame 13), are angled against the X-axis and Y-axis directions in a plan view. Specifically, each edge extends along a line connecting an inner edge and an outer edge of each corner of the panel holding portion 13a. The long-side frame pieces 13SL (refer to FIG. 6) cover not only the liquid crystal panel 11, the optical members 15, and the light guide plate 16 but also the LED units LU. The short-side frame pieces 13SS (see FIG. 8) do not cover the LED units LU. Therefore, the long-side frame piece 13SL has a relatively larger width than the short-side frame pieces 13SS.

As illustrated in FIG. 4 and FIG. 5, the panel holding portion 13a of the frame 13 include a holding protrusion 24 that protrudes from an inner end thereof toward the rear side, i.e., toward the liquid crystal panel 11. The holding protrusion 24 includes a shock absorber 24a at its protruded end. The holding protrusion 24 can press the liquid crystal panel 11 from the front side via the shock absorber 24a. Like the screw attachment 21, the holding protrusion 24 and the shock absorber 24a include separate pieces thereof that extend along the frame pieces 13S of the frame 13. When the frame pieces 13S are assembled together, the holding protrusion 24 and the shock absorber 24a each form a frame-like shape that extends along the inner peripheral end of the panel holding portion 13a.

As illustrated in FIG. 4 and FIG. 5, the panel holding portion 13a integrally includes the screw attachment portions (fixing member attachment portions) 21, to each of which the screw member (a fixing member) SM is attached, at a more interior position than the side wall 13b of the panel holding portion 13a (a position away from the side wall 13b toward the light guide plate 16). The screw attachment portions 21 each protrude from an inner surface of the panel holding portion 13a toward the rear side in the Z-axis direction and each have an elongated block-like shape that extends along a side of the panel holding portion 13a (in the X-axis direction and the Y-axis direction). The screw attachment portions 21 each extend on each side of the panel holding portion 13a with a length equal to the length of each side. As illustrated in FIG. 9, the screw attachment portions 21 are each disposed on each frame piece 13S included in the frame 13. When the frame pieces 13S are connected with each other, the attachment portions 21 form a frame-like shape that extends along an inner surface of the side wall 13b having a rectangular hollow shape over its entire length. As illustrated in FIG. 4 and FIG. 5, each screw attachment portion 21 includes a groove 21a that opens to the rear side and to which the screw member SM can be fastened. The groove 21a extends in the longitudinal direction of the screw attachment portion 21 over substantially the entire length thereof. The groove 21a has a width that is slightly smaller than the shaft of the screw member SM. The screw attachment portion 21 is positioned between the panel holding portion 13a of the frame 13 and the chassis 14 in the Z-axis direction.

Figure 6:
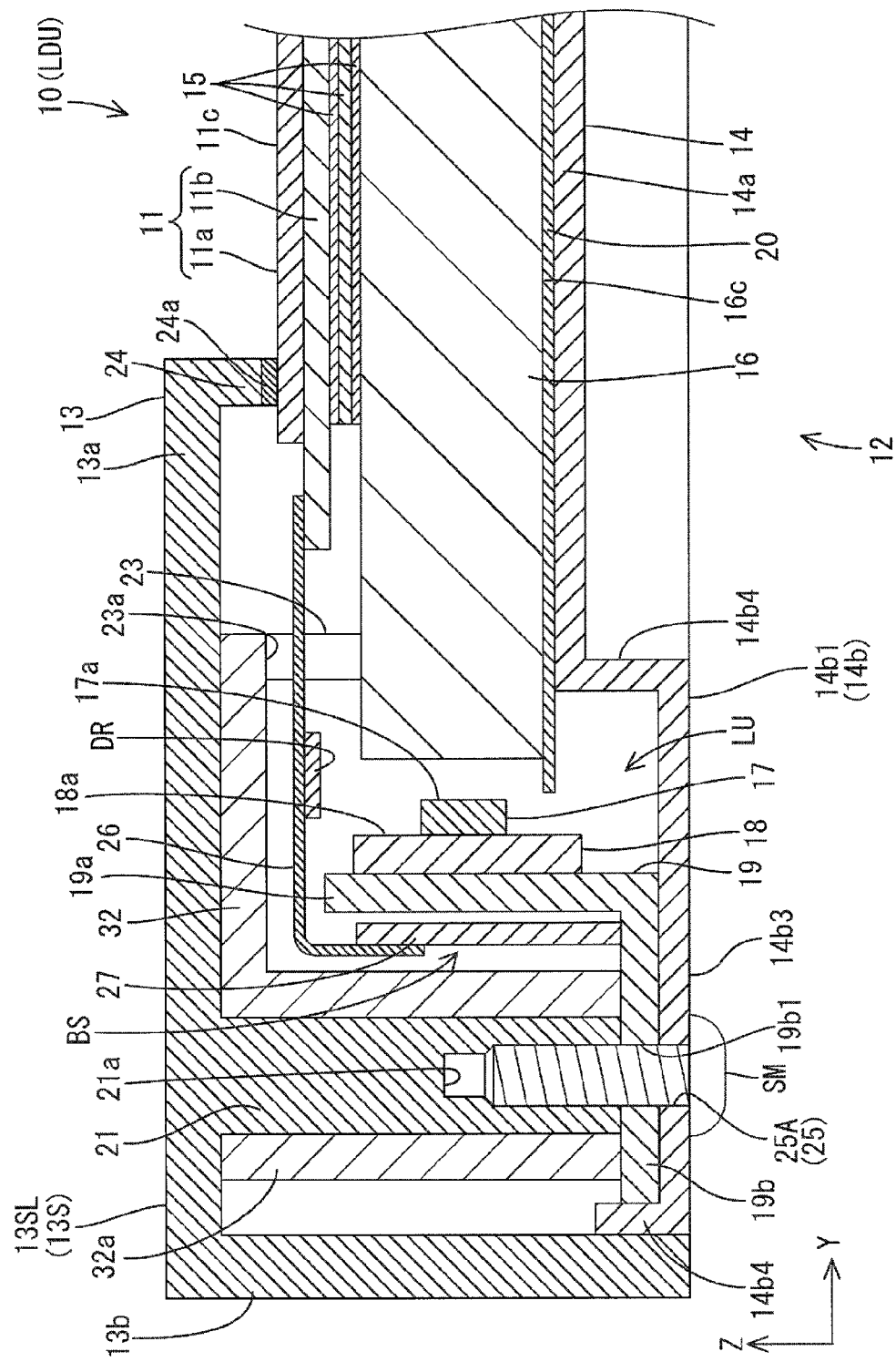
FIG. 6 is a magnified cross-sectional view of the liquid crystal display device. The liquid crystal display device is taken in the short-side direction thereof along a line passing a flexible board (a joint screw hole).
Figure 7:
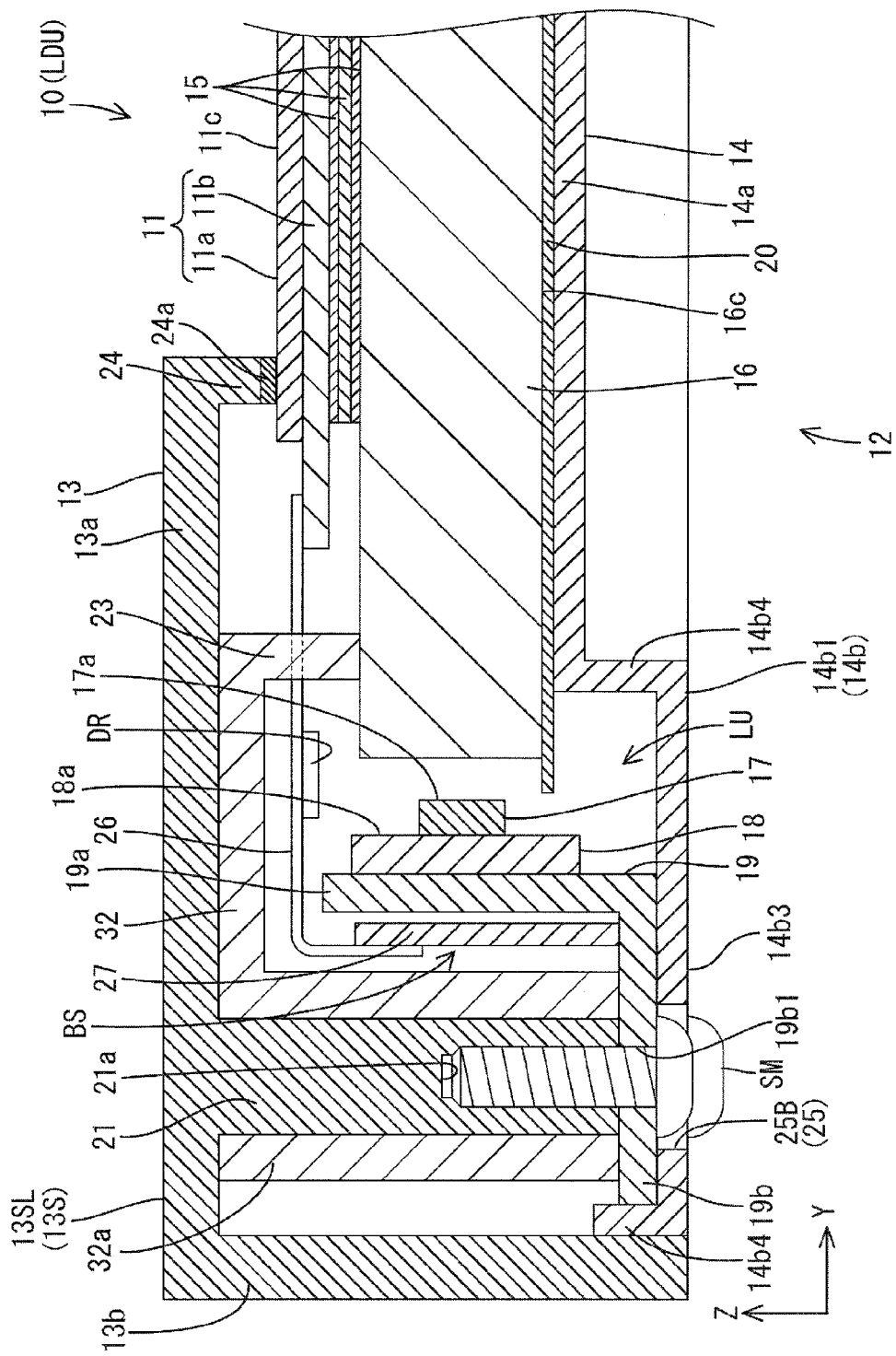
FIG. 7 is a magnified cross-sectional view of the liquid crystal display device. The liquid crystal display device is taken in the short-side direction along a line passing a light guide plate support (a heat dissipation member screw hole).

As illustrated in FIG. 4, the screw attachment portions 21 that extend along the long sides are each positioned between the side wall 13b of the frame 13 and the LED attachment portion 19a of the heat dissipation member 19, which is included in the LED unit LU, in the Y-axis direction. The screw attachment portion 21 is away from the LED attachment portion 19a by a predetermined distance. As illustrated in FIG. 6 and FIG. 7, a space between one of the heat dissipation members 19 that overlaps the flexible board 26 in a plan view and the screw attachment portion 21, to which the heat dissipation member 19 is attached, provides a board housing space BS in which the printed circuit board 27 is placed. The printed circuit board 27 is placed between the screw attachment portion 21 and the LED attachment portion 19a. The printed circuit board 27 is made of synthetic resin and has an elongated plate-like shape that extends in the longitudinal direction of the screw attachment portion 21 and the LED attachment portion 19a (in the X-axis direction). The printed circuit board 27 is placed in the board housing space BS such that a plate surface of the printed circuit board 27 extends parallel to an outer plate surface of the LED attachment portion 19a (a surface opposite to the LED board 18 side). In other words, the printed circuit board 27 is placed in the board housing space BS such that the long-side direction, the short-side direction, and the thickness direction of the printed circuit board 18 correspond to the X-axis direction, the Z-axis direction, and the Y-axis direction, respectively. On the printed circuit board 27, multiple flexible boards 26 are arranged so as to be away from each other in the long-side direction of the printed circuit board 27 and connected to the printed circuit board 27 at the other end thereof. The flexible boards 26, which are connected to the printed circuit board 27 and the array board 11b of the liquid crystal panel 11, extend over the LED attachment portion 19a, the LED board 18, and the LEDs 17 in the Y-axis direction. The printed circuit board 27 includes a connecter (not illustrated) to which an end of an FPC (not illustrated) is connected. The other end of the FPC extends to the rear side of the chassis 14 through an FPC hole (not illustrated) in the chassis 14 and is connected to the control board CTB.

As illustrated in FIG. 4, a sub frame 32 is attached to the panel holding portion 13a of the frame 13 such that the sub frame 32 is fitted to the screw attachment portion 21. The sub frame 32 is made of synthetic resin and has a landscape frame-like shape as a whole like the frame 13. The sub frame 32 is in contact with the inner surface (the surface facing the rear side) of the panel holding portion 13a when the sub frame 32 is fitted to the screw attachment portion 21. The sub frame 32 includes a tubular portion 32a at a position overlapping the screw attachment portion 32 in a plan view. The tubular portion 32a surrounds the outer surface of the screw attachment portion 21 (see FIG. 6 for the tubular portion 32a). The width of the sub frame 32 having a frame-like shape is smaller than that of the frame 13. The sub frame 32 has an outer end that is located inwardly of the side wall 13b and an inner end that is located outwardly of the panel holding portion 24.

As illustrated in FIG. 4 and FIG. 5, the sub frame 32 integrally includes light guide plate holding portions 23 at the inner end of the sub frame 32. The light guide plate holding portions 23 support the light guide plate 16 from the front side (the display surface 11c side). The light guide plate holding portions 23 protrude from the inner surface of the sub frame 32 toward the rear side (the light guide plate 16) in the Z-axis direction (the protruding direction of the screw attachment portion 21). The light guide plate holding portions 23 each have an elongated block-like shape and extend along pieces of the sub frame 32. The light guide plate holding portions 23 are each provided on each side of the sub frame 32 and extends the entire length of each side. The light guide plate holding portions 23 form an elongated frame-like shape as a whole like the sub frame 32. The light guide plate holding portions 23 are in contact with the front surface, i.e., the light exit surface 16a, of the end portion of the light guide plate 16 that is located outwardly of the liquid crystal panel 11. The light guide plate holding portions 23 are configured to sandwich the light guide plate 16 between the light guide plate holding portions 23 and the chassis 14, which will be described later, so as to support the light plate 16 from the front side (the display surface 11c side). The light guide plate holding portions 23 have a light guide plate support function.

As illustrated in FIG. 4, two light guide plate holding portions 23 that extend along the long sides of the sub frame 32 support the long-side ends of the light guide plate 16, which has the light entrance surface 16b. With this configuration, the positional relationship between the LEDs 17 and the light entrance surface 16b in the Z-axis direction can be stably maintained. Two light guide plate holding portions 23 that are on the long sides are arranged between the liquid crystal panel 11 and the LEDs 17. Specifically, each of the light guide plate holding portions 23 on the long side shuts the space between the LEDs 17 and the end surfaces of the liquid crystal panel 11 and the optical members 15 on the LEDs 17 side. Therefore, light from the LEDs 17 is less likely to directly enter the end surfaces of the liquid crystal panel 11 and the optical members 15 without passing through the light guide plate 16. In other words, the light guide plate holding portions 23 on long sides each function as a light blocking portion that blocks light. One of the light guide plate holding portions 23 on the long side that overlaps the flexible boards 26 in a plan view includes flexible board openings 23a. The flexible board openings 23a are arranged in line at intervals in the X-axis direction. The arrangement of the flexible board opening 23a matches the arrangement of the flexible boards 26.

As illustrated in FIG. 3, the chassis 14 has a substantially tray-like shape having a horizontally elongated shape as a whole and covers the entire of the light guide plate 16 and the LED units LU from the rear side. The chassis 14 has a rear outer surface (the surface opposite to the surface facing the light guide plate 16 and the LED unit LU) that is exposed to the outside of the liquid crystal display device 10 and provides a rear surface of the liquid crystal display device 10. The chassis 14 includes a light guide plate receiving portion 14a and a housing 14b. The light guide plate receiving portion 14a has a horizontally elongated rectangular shape like the light guide plate 16. The housing 14b protrudes from an outer peripheral end of the light guide plate receiving portion 14a toward the rear side in a step-like shape and houses the LED unit LU and the relay wiring member 28, which will be described later. The light guide plate 16 is arranged such that a middle section thereof overlaps the light guide plate receiving portion 14a in a plan view and an outer peripheral section thereof protrudes outwardly from the light guide plate receiving portion 14a and overlaps the housing 14b in a plan view.

As illustrated in FIG. 3 and FIG. 5, the light guide plate receiving portion 14a has a plate-like shape so as to receive the most of the middle section of the light guide plate 16 from the rear side. The housing 14b has a horizontally elongated frame-like shape and surrounds the light guide plate receiving portion 14a in a plan view. The housing 14b is recessed from the light guide plate receiving portion 14a toward the rear side to have a space in which the LED unit LU and the relay wiring member 28 can be housed. A pair of long-side sections of the housing 14b is a pair of LED unit housings 14b1 that houses the LED units LU. A pair of short-side sections of the housing 14b is a pair of relay member housings 14b that house the relay wiring member 28. As illustrated in FIG. 4, the LED unit housings 14b1 each include a bottom plate 14b3, which extends parallel to the light guide plate receiving portion 14a, and a pair of side plates 14b4, which extends upward from ends of the bottom plate 14b3 toward the front side. An inner one of the side plates 14b4 is continuous with the light guide plate receiving portion 14a. On the bottom plate 14b3, the heat dissipation portion 19b of the heat dissipation member 19, which is included in the LED unit LU, is disposed such that a surface of the heat dissipation portion 19b is in contact with the inner surface of the bottom plate 14b3. A screw member (a fixing member) SM is attached to the bottom plate 14b3 from the outside to fix the frame 13 and the chassis 14 together.

As illustrated in FIG. 5, the relay member housing 14b2 includes a bottom plate 14b5, which extends parallel to the light guide plate receiving portion 14a, and a side plate 14b6, which extends upward from an inner end of the bottom plate 14b5 and is continuous with the light guide plate receiving portion 14a. The bottom plate 14b5 overlaps the short-side end of the light guide plate 16 in a plan view. The bottom plate 14b5 faces the light guide plate 16 with a predetermined space therebetween in the Z-axis direction. The relay wiring member 28, which will be described later, is places in the space between the bottom plate 14b5 and the light guide plate 16. The screw member (the fixing member) SM is attached to the bottom plate 14b5 from the outside to fix the frame 13 and the chassis 14 together.

As illustrated in FIG. 6 to FIG. 8, the bottom plates 14b3, 14b5 included in the housing 14b1, 14b2 include screw holes 25 through which the screw member SM is passed. An outer section of each bottom plate 14b3, 14b5 overlaps the screw attachment portion 21 of the frame 13 in a plan view. The screw hole 25 included in each bottom plate 14b3, 14b5 is communicated with a groove 21a of the screw attachment portion 21. With this configuration, the screw member SM is passed through the screw hole 25 in the Z-axis direction (the overlapping direction of the liquid crystal panel 11, the optical member 15, and the light guide plate 16) from the rear side of the chassis 14 (the side opposite to the display surface 11c side). The screw member SM is fastened to the groove 21a of the screw attachment portion 21 with the bottom plates 14b3, 14b5 disposed therebetween. When the screw member SM is fastened, the groove 21a is threaded by a thread of the shaft of the screw member SM. The screw holes 25 in the bottom plates 14b3 included in the LED housing 14b1 each include a joint screw hole 25A and a heat dissipation member screw hole 25B. As illustrated in FIG. 6, the joint screw hole 25A has a size through which only the shaft of the screw member SM can pass. As illustrated in FIG. 7, the heat dissipation member screw hole 25B has a size through which both of a head and the shaft of the screw member SM can pass. The screw member SM is passed through the joint screw hole 25A to fasten the heat dissipation portion 19b and the bottom plate 14b3 together to the screw attachment portion 21. The screw member SM is passed through the heat dissipation member screw hole 25B to fasten only the heat dissipation portion 19b to the screw attachment portion 21.

Figure 11:
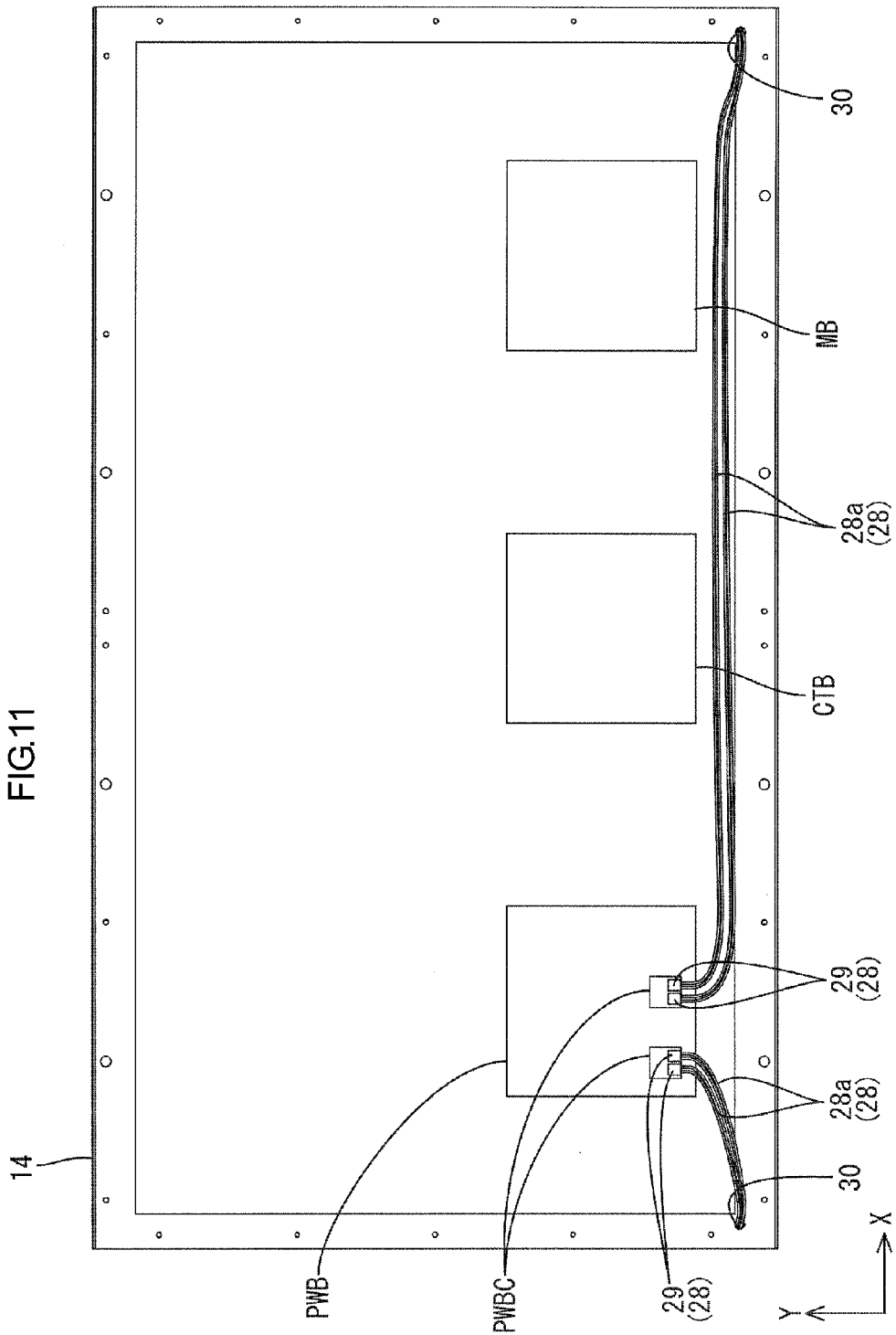
FIG. 11 is a rear view illustrating a rear surface of the chassis to which various boards are attached.

A wiring configuration of the LEDs 17 included in the liquid crystal display device 10 will be described in detail. As illustrated in FIG. 9 and FIG. 11, the LED boards 18, on which the LEDs 17 are mounted, and the power source board PWB, which is an LED drive board, are electrically connected via the relay wiring members 28 to feed power (to supply drive power) to each LED 17. Each relay wiring member 28 includes a plurality of covered wires (wiring members) 28a and a relay member connector 29. The covered wires 28a extend along the wiring route. The relay member connector 29 is disposed on each end of a covered wire bundle including the covered wires 28a. One of the relay member connectors 29 is connected to the base relay terminals 22 of the LED board 18. Another one of the relay member connectors 29 is connected to the base connector PWBC included in the power source board PWB. The relay wiring member 28 is individually provided for each LED board. The number of relay wiring member 28 is the same as that of the LED board 18. In this embodiment, four relay wiring members 28 are provided. The LED boards 18 connected via the relay wiring members 28 are arranged inside the space between the frame 13 and the chassis 14. The power source board PWB is arranged outside the space between the frame 13 and the chassis 14 (on the outer surface of the chassis 14). The chassis 14 includes relay member through holes 30 through which the relay wiring members 28 extend between the inside and the outside of the chassis 14.

As illustrated in FIG. 2 and FIG. 9, since the chassis 14 is an exterior member that provides an outer appearance of the liquid crystal display device 10, the relay member through holes 30 are positioned so as to be covered by the cover CV such that the relay wiring members 28 are not exposed to the outside of the liquid crystal display 10. Specifically, as illustrated in FIG. 11, the relay member through holes 30 are each positioned close to one end of the light guide plate receiving portion 14a of the chassis 14 in the short-side direction (the lower side in FIG. 9 and FIG. 11), namely, around a pair of corners (ends in the long-side direction). In the liquid crystal display device 10 of this embodiment, two pairs of the LED units LU are arranged on each end in the short-side direction such that the light guide plate 16 is disposed between two pairs of the LED units LU. One pair of the LED units LU is disposed on the side of the cover CV and the relay member through hole 30 (the lower side in FIG. 9 and FIG. 11). The other one pair of the LED units LU is disposed on the side opposite to the side of the cover CV and the relay member through hole 30 (the upper side in FIG. 9 and FIG. 11). The relay wiring members 28 that are connected to the LED boards 18 on the upper side in FIG. 9 and FIG. 11 need to extend inside the chassis 14 in the Y-axis direction to the relay member through holes 30. The short-side ends of the chassis 14 each include the relay member housing 14b2, as illustrated in FIG. 5, and the covered wires 28a of the relay wiring member 28 are placed in the space defined by the bottom plate 14b5 of the relay member housing 14b2 and the short-side end of the light guide plate 16 such that the relay wiring member 28 extends inside the chassis 14 to the relay member through hole 30. The covered wires 28a of the relay wiring member 28 cannot be directly seen from the front side, because the covered wires 28 overlap the short-side ends of the light guide plate 16 and is covered by the short-side end of the light guide reflection sheet 20 from the front side.

The LED boards 18 included in the LED units LU according to this embodiment each include the board relay terminals 22 on one end of the LED board 18. As illustrated in FIG. 9, the LED boards 18 that are arranged in the long-side direction of the light guide plate 16 and the LED boards 18 that are arranged with the light guide plate 16 therebetween are symmetric with respect to the center lines CL1, CL2 that extend along the sides of the light guide plate 16. Specifically, two LED boards 18 that are arranged in the long-side direction of the light guide plate 16 are symmetric with respect to the center line CL1 that extends along the short-side direction of the light guide plate 16. The board relay terminals 22 included in each LED board 18 are arranged on the end of the LED board 18 in the long-side direction of the light guide plate 16. Two LED boards 18 that are arranged with the light guide plate 16 therebetween in the short-side direction of the light guide plate 16 are symmetric with respect to the center line CL2 that extends along the long-side direction of the light guide plate 16. The board relay terminals 22 included in one of the LED boards 18 face the board relay terminals 22 included in the other one of the LED boards 18 with the light guide plate 16 therebetween. On the LED board, board connectors that are configured to receive the relay member connectors 29 from only one side in the Z-axis direction may be disposed. In such a case, when the relay member connectors 29 are all fitted from the one direction, LED boards having the same configuration cannot be used, and thus at least two different kinds of LED boards need to be provided.

As illustrated in FIG. 12, the LED board 18 according to this embodiment does not include the connector structure on the LED board 18 side. The relay member connector 29 of the relay wiring member 28 is directly connected to the board relay terminals 22 on the end of the wiring pattern. In addition, the board relay terminals 22 are arranged such that the relay member connector 29 that is orientated to either side in the Z-axis direction (the thickness direction of the light guide plate 16) is allowed to be connected to the board relay terminals 22. In this configuration, the LED boards 18 that are arranged symmetric with respect to the center line CL1, CL2 can have the same configuration. The relay member connectors 29 can be connected to the relay member terminals 22 included in each LED board 18 while the relay member connectors 29 are orientated to the same direction with the covered wires 28a extending to the rear side (the chassis 14 side). Accordingly, the relay member connectors 29 can be oriented to the same direction for connection and the LED boards 18 that are disposed symmetric with respect to the center line CL1, CL2 can have the same configuration. Only one kind of LED board 18 needs to be provided. Next, the detailed configuration of the board relay terminals 22 and the relay member connector 29 will be described.

Figure 14:
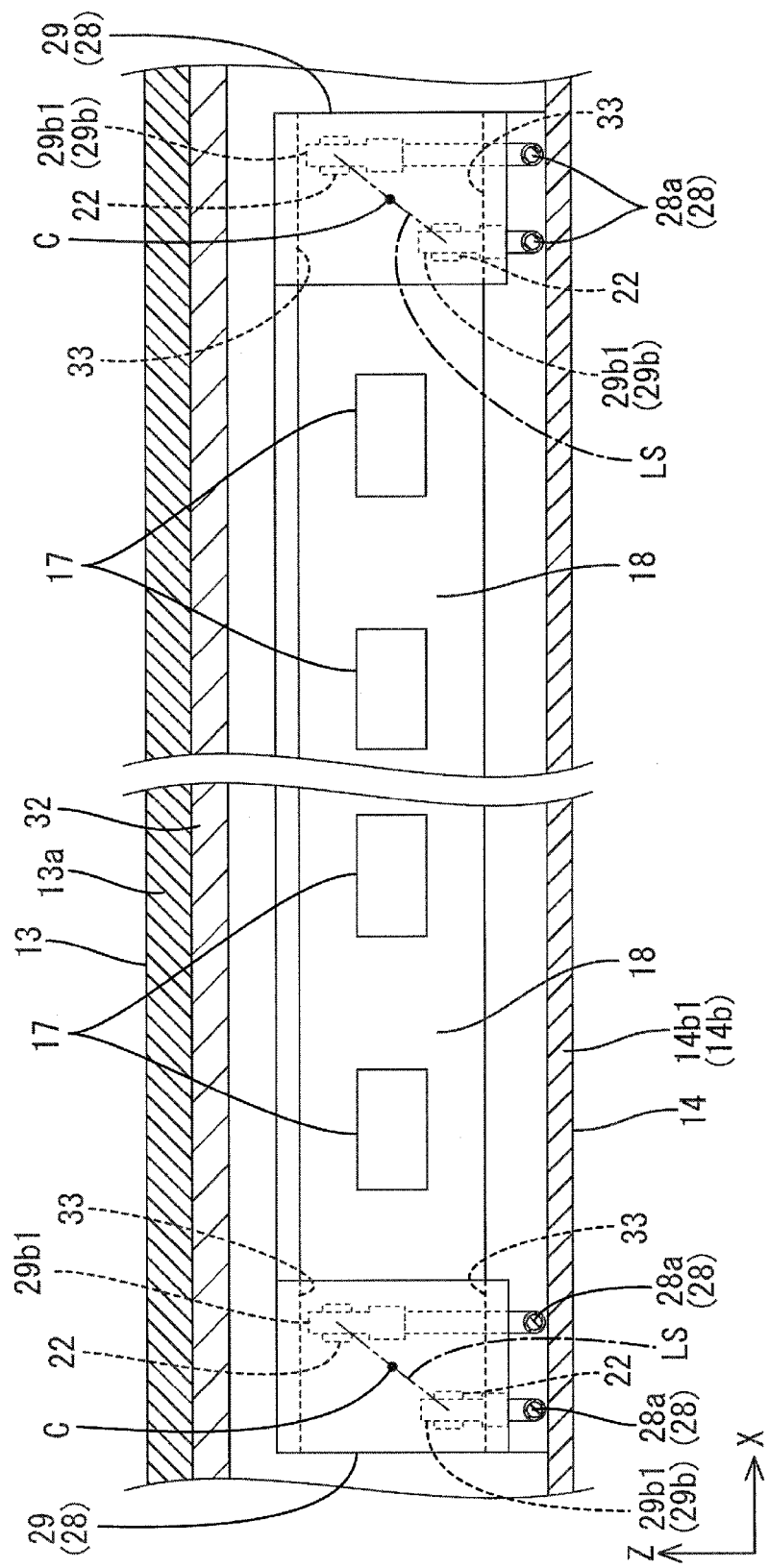
FIG. 14 is a cross-sectional view taken along a line xiv-xiv in FIG. 13.

As illustrated in FIG. 12 and FIG. 14, an anode-side relay terminal 22 and a cathode-side relay terminal 22 are provided in a pair and each are connected to an anode side end and a cathode side end of the wiring pattern. Each board relay terminal 22 is an extension of the wiring pattern on the mount surface 18a. The insulation layer formed over the mount surface 18a of the LED board 18 includes openings or parts of the insulation layer are eliminated such the board relay terminals 22 are exposed to the outside, and thus the relay wiring members 28 can be conductively connected thereto. The board relay terminals 22 each have a rectangular shape in a front view. The wiring pattern extends on the LED board 18 in the long-side direction (the X-axis direction, the arrangement direction of the LEDs 17) and turns back. Specifically, the wiring pattern includes an anode side end and a cathode side end. The wiring pattern is connected to the anode-side terminal and the cathode-side terminal (not illustrated) of each LED 17 while extending across the adjacent LEDs 17 with the anode side end which is connected to the anode-side board relay terminal 22 as an extension start point. Thus, the LEDs 17 are connected in series. When the wiring pattern reaches the end of the LED board 18 opposite to the board relay terminals 22 on the LED board 18, the wiring pattern turns back and extends straightly toward the board relay terminals 22 such that the cathode-side end, which is an extension end thereof, is connected to the cathode-side board relay terminal 22. FIG. 14 illustrates the board relay terminals 22 on the LED boards 18 on the right and on the left that are arranged in the long-side direction (the X-axis direction) of the light guide plate 16.

As illustrated in FIG. 14, two board relay terminals 22 are arranged on the mount surface 18a of the LED board 18 so as to be symmetric with respect to a rotation center C of the relay member connector 29 of the relay wiring member 28, which is to be connected to the board relay terminals 22. Specifically, the anode-side board relay terminal 22 and the cathode-side board relay terminal 22 are in a direction inclined with respect to the Z-axis direction (the thickness direction of the light guide plate 16). A line segment LS connecting the centers of two board relay terminals 22 has the center that coincides with the rotation center C of the relay member connector 29. In FIG. 14, the line segment LS is indicated by a two-dotted chain line. With this configuration, the relay member connector 29 that is orientated to any side in the Z-axis direction can be connected to the board relay terminals 22.

As illustrated in FIG. 9 and FIG. 14, the board relay terminals 22 are located on the end of the LED board 18 in the long-side direction, specifically, close to outer ends of the frame 13 and the light guide plate 16 in the long-side direction (the ends adjacent to the short-side portion of the frame 13). Accordingly, the board relay terminals 22 included in each of four LED boards 18 are disposed around each of four corners (four positions at the corners) of the frame 13 and the light guide plate 16. The board relay terminals 22 are non-light emitting part of the LED board 18. The board relay terminals 22 are positioned on the ends of the LED board 18 so as not to block the light from the LEDs 17. Since each LED board 18 includes the board relay terminals 22 on one of the ends thereof, the LED board 18 is asymmetric with respect to the axis passing through the center in the longitudinal direction of the LED board 18.

Figure 13:
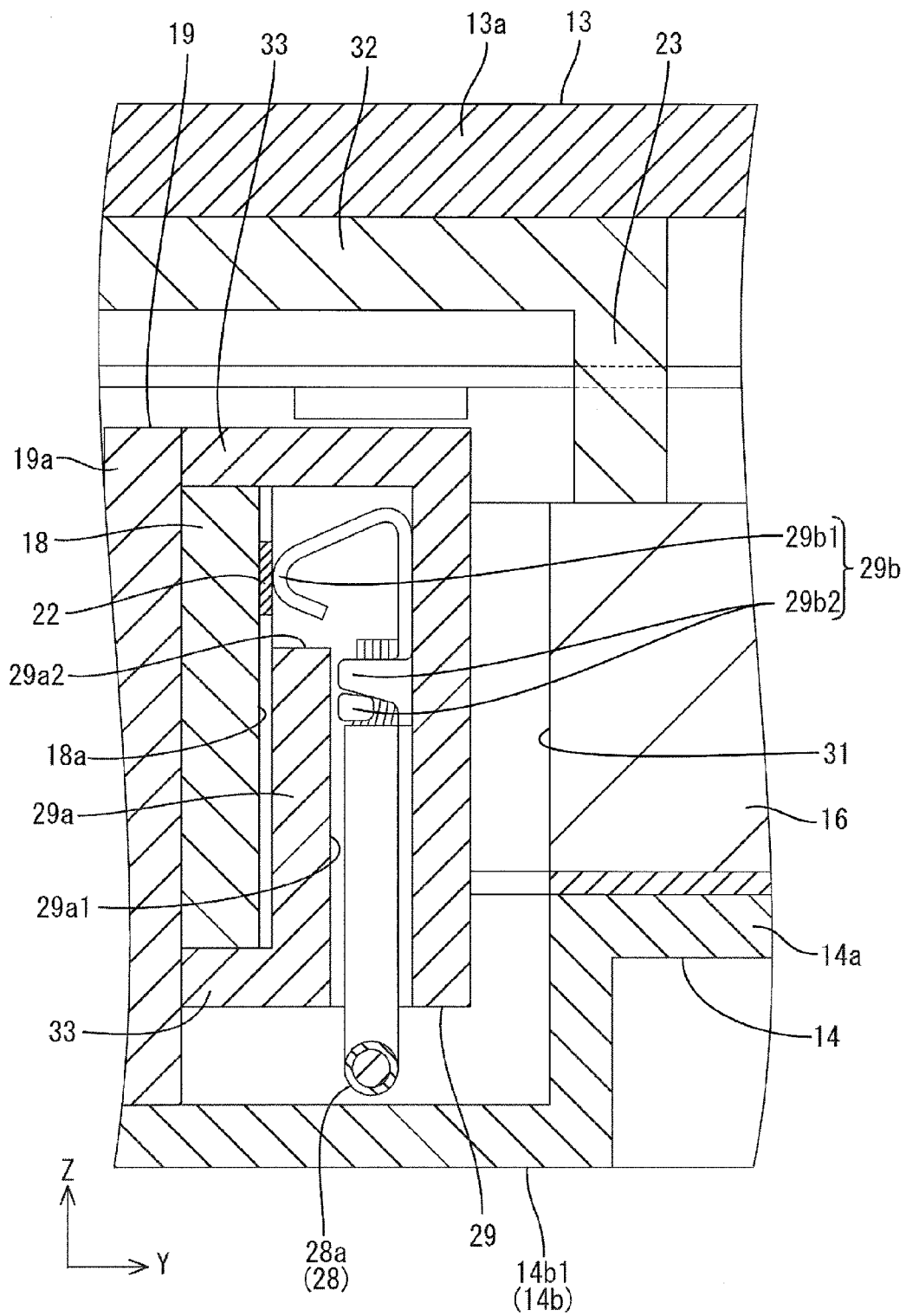
FIG. 13 is a magnified view of the cross-sectional view in FIG. 12.

As illustrated in FIG. 12 to FIG. 14, the relay member connector 29 connected to the board relay terminals 22 includes a relay member connector housing 29a and a relay member terminal fitting 29b. The relay member connector housing 29a is made of synthetic resin and has a substantially block-like shape. The relay member terminal fitting 29b is made of metal and housed in the relay member connector housing 29a. The relay member connector housing 29a includes a cavity 29a1 through which the relay member terminal fitting 29b can be inserted into the relay member connector housing 29a from the rear side (the chassis 14 side) and an opening 29a2 that is communicated with the cavity 29a1 and opens toward the LED board 18. The relay member connector housing 29a faces the inner surface (the surface facing the light guide plate 16) of the end of the LED board 18 on which the board relay terminals 22 are arranged. The relay member terminal fitting 29b includes an elastic contact piece 29b1 and a barrel 29b2. The elastic contact piece 29b1 has a cantilevered shape and is exposed to the outside of the cavity 29a1 through the opening 29a2. The elastic contact piece is in elastic contact with the board relay terminal 22 of the LED board 18. The barrel 29b2 is crimped to the end of the covered wire 28a of the relay wiring member 28.

The relay member terminal fitting 29b is provided in the same number as the board relay terminals 22 of the LED board 18, i.e., two relay member terminal fittings 29b are provided for one relay member connector 29. The relay member connector housing 29a includes two cavities 29a1 and two openings 29a2 so as to correspond to the relay member terminal fittings 29b. The openings 29a2 and the elastic contact pieces 29b1 that pass therethrough are arranged in the same manner as the board relay terminals 22, i.e., arranged symmetric with respect to the rotation center C of the relay member connector 29. Specifically, the openings 29a2 and the elastic contact pieces 29b1 are arranged in a direction inclined with respect to the Z-axis direction (the thickness direction of the light guide plate 16), and line segments each connecting centers of the openings 29a2 and the elastic contact pieces 29b1 have the center coincides with the rotation center C of the relay member connector 29. The cavities 29a1 have different length (the depth) depending on the formation positions of the openings 29a2. The cavity 29a1 that communicates with the opening 29a2 located more front than the rotation center C (located on a deeper side in the insertion direction of the relay member terminal fitting 29b into the cavity 29a1) is relatively long. The cavity 29a1 that communicates with the opening 29a2 located more rear than the rotation center C (located on a shallow side in the insertion direction of the relay member terminal fitting 29b1 into the cavity 29a1) is relatively short. The relay member terminal fittings 29b include an anode-side relay member terminal fitting 29b that is connected to the anode-side board relay terminal 22 and a cathode-side relay member terminal fitting 29b that is connected to the cathode-side board relay terminal 22. The board relay terminals 22 are all connected to the relay member terminal fittings 29b of the relay member connector 29.

As illustrated in FIG. 12 and FIG. 13, the relay member connector housing 29a of the relay member connector 29 includes retainers 33 that sandwich the LED board 18 from the front side and the rear side in the Z-axis direction to retain the LED board 18. Two retainers 33 are provided such that each of which is disposed on each end of the relay member connector housing 29a in the Z-axis direction and protrude toward the LED board 18. The retainers 33 are away from each other in the Z-axis direction by the dimension substantially same as the width of the LED board 18. In this configuration, the LED board 18 is press fitted between the retainers 33. In the LED board 18, the end thereof that includes the board relay terminals 22 is retained by the retainers 33 and connected to the relay member terminal fittings 29b. The end of the LED board 18 may be referred to as a board connection portion. The retainers 33 extend over the entire width of the relay member connector housing 29a. The retainer 33 covers the elastic contact piece 29b1 that is exposed to the outside through the opening 29a2.

As illustrated in FIG. 9, the light guide plate 16 includes relay wiring member through recesses 31. Each relay wiring member through recesses 31 is a cutout through which the relay member connector 29 connected to the LED board 18 is passed. The relay member connector 29 protrudes more from the mount surface 18a of the LED board 18 than the LED 17, because the relay member connector 29 has the housing space for the relay member terminal fitting 29b therein. The light guide plate 16 overlaps the board relay terminals 22, which are located on the end of the LED board 18, and the relay member connector 29, which is connected to the board relay terminals 22, in the X-axis direction, because the light guide plate 16 has the short-side end that is positioned outside the display area of the liquid crystal panel 11. If the light guide plate 16 does not include the relay wiring member through recess 31, the light entrance surface 16b of the light guide plate 16 and the mount surface 18a of the LED board 18 needs to be away from each other by a size corresponding to the relay member connector 29. In such a case, the main light emitting surface 17a of the LED 17 is far away from the light entrance surface 16b, and thus light incidence efficiency may be lowered. Unlike such a configuration, as described above, since the relay wiring member through recesses 31 through which the relay member connectors 29 are passed are formed by cutting the light guide plate 16, the light entrance surface 16b of the light guide plate 16b is away from the mount surface of the LED board 18 by the dimension smaller than the height of the relay member connector 29. With this configuration, the main light emitting surface 17a of the LED 17 is not far away from the light entrance surface 16b, and thus the light incidence efficiency can be improved. The relay wiring member through recesses 31 are cutouts at four corners of the light guide plate 16, and thus correspond to the board relay terminals 22 of four LED boards 22 in a plan view.

Figure 15:
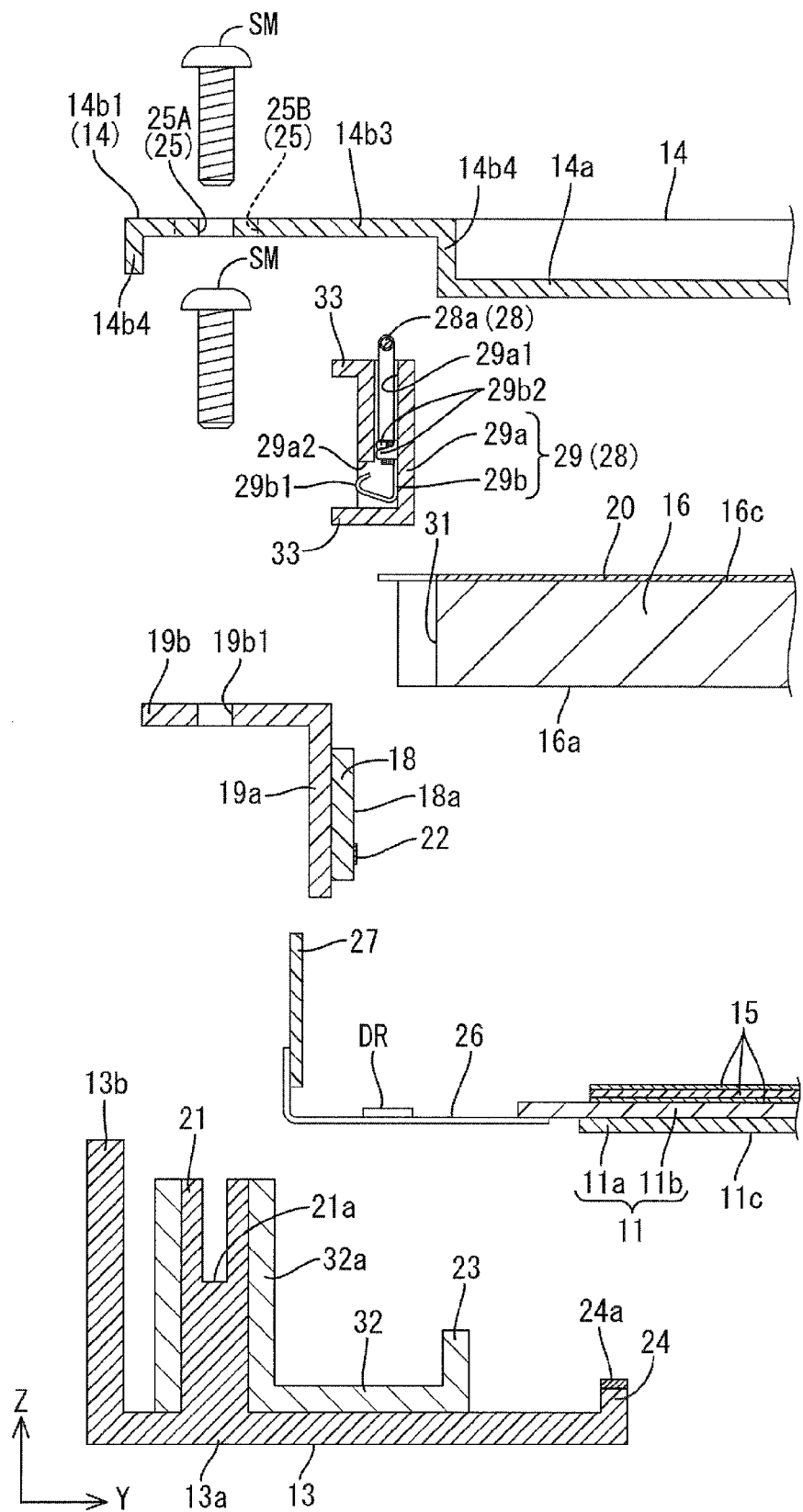
FIG. 15 is a cross-sectional view illustrating a cross-sectional configuration of the liquid crystal display device taken in the short-side direction (a cross-sectional configuration taken along a line xii-xii in FIG. 10). The view is used to explain an assembly procedure of components included in a liquid crystal display unit that constitutes the liquid crystal display device.
Figure 17:
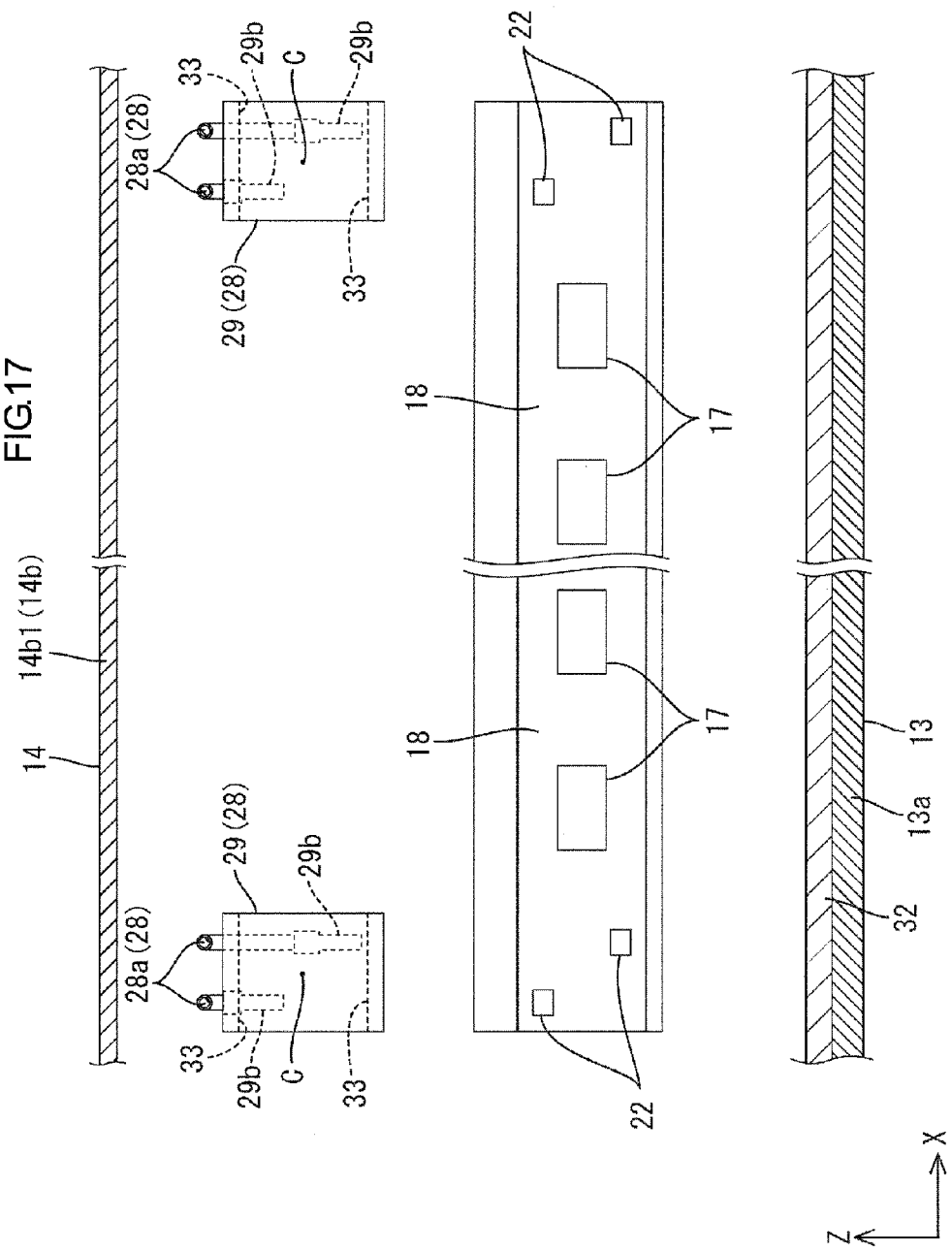
FIG. 17 is a cross-sectional view illustrating a cross-sectional configuration of the liquid crystal device taken in the short-side direction (a cross-sectional configuration taken along a line xiv-xiv in FIG. 13). The view illustrates an assembly procedure of the components included in the liquid crystal display unit that constitutes the liquid crystal display device.

The present embodiment has the above-described structure, and an operation thereof will be described. The components (e.g. the frame 13, the chassis 14, the liquid crystal panel 11, the optical members 15, the light guide plate 16, the LED units LU, and the relay wiring member 28) that are separately produced are assembled into the liquid crystal display device 10. In the assembly, all of the components orientated as in FIG. 8 and FIG. 12 are turned upside down in the Z-axis direction. As illustrated in FIG. 15 to FIG. 17, the frame 13 of the components is placed on a workbench, which is not illustrated, with the rear surface thereof facing the upside in the vertical direction. The sub frame 32 is attached to the frame 13 including four frame pieces 13S that are joined together in a frame shape in advance.

As illustrated in FIG. 15, the flexible boards 26 and the printed circuit board 27 are connected to the liquid crystal panel 11 in advance. As illustrated in FIG. 15 and FIG. 16, the liquid crystal panel 11 is then mounted to the frame 13 in the above state. During the mounting operation, the CF substrate 11a is arranged on the lower side in the vertical direction and the array substrate 11b is arranged on the upper side in the vertical direction. The printed circuit board 27 is attached to the screw attachment portion 21 such that the plate surface of the printed circuit board 27 extends along a surface of the screw attachment portion 21 of the frame 13 that faces the liquid crystal panel 11. As a result, each flexible board 26 is bent into an L-like shape. In this attachment process, the flexible boards 26 are positioned with respect to the respective flexible board through recesses 23a of the light guide plate holding portion 23, which overlap the flexible boards 26 in a plan view, and inserted therethrough. The liquid crystal panel 11 is placed on the shock absorber 24a attached on the holding protrusion 24 so that shocks are absorbed by the shock absorber 24a. Then, the optical members 15 are sequentially placed on the rear surface of the liquid crystal panel 11.

Next, as illustrated in FIG. 15, the LED unit LU including the LED 17, the LED board 18, and the heat dissipation member 19 that are assembled together in advance is mounted to the frame 13. The LED unit LU is attached to the screw attachment portion 21 of the frame 13 with the LED 17 facing the side corresponding to the middle (inward) of the frame 13 and the heat dissipation portion 19b of the heat dissipation member 19 facing the screw attachment portion 21 of the frame 16. In a state in which the LED units LU are attached to the screw attachment portions 21, each of the through holes 19b1 of the heat dissipation portion 19b communicates with the groove 21a of each screw attachment portion 21. The LED unit LU that overlaps the flexible boards 26 in a plan view forms the board housing space BS between the LED attachment portion 19a and the screw attachment portion 21 when the heat dissipation member 19 is attached to the screw attachment portion 21. The printed board 27 is placed in the board housing space BS. After the attachment of the LED units LU to the screw attachment portion 21, the screw member SM is passed through the predetermined through hole 19b1 of the heat dissipation portion 19b from the rear side and fastened to the groove 21a of the screw attachment portion 21. The heat dissipation portion 19b of the heat dissipation member 19 is sandwiched between the head portion of the screw member SM and the screw attachment portion 21. Therefore, the LED units LU are attached to the screw attachment portion 21 in advance of the mounting operation of the chassis 14, which will be described later (see FIG. 7). The LED units LU may be mounted to the frame 13 before the mounting operation of the optical members 15 or the liquid crystal panel 11 to the frame 13.

In the LED units LU that are mounted as above, the LED boards 18 having the same configuration (common parts) are used. As illustrated in FIG. 9 and as described above, the LED boards 18 each include the board relay terminals 22 at one end thereof. Two of the LED boards 18 that are arranged in the long-side direction are symmetric with respect to the center line CL1. Two of the LED boards 18 that are arranged with the light guide plate therebetween in the short-side direction are symmetric with respect to the center line CL2. The center lines CL1, CL2 extend along each side of the light guide plate 16. As illustrated in FIG. 17, the board relay terminals 22 that are provided on each LED board 18 are arranged such that the relay member connector 29 that are orientated to either side in the Z-axis direction (the thickness direction of the light guide plate 16) can be connected thereto. Regardless of the arrangement of the LED boards 18 with respect to the light guide plate 16, the relay member connectors 29 each of which includes the covered wire 28a extending on the chassis 14 side (the rear side) can be connected to all of the board relay terminals 22 from the chassis 14 side. The LED boards 18 can have the same configuration and the relay member connectors 29 can be connected from the same direction.

After the LED unit LU is screwed to the screw attachment portion 21, as illustrated in FIG. 15 and FIG. 16, the light guide plate 16 is directly placed on the rear surface of one of the optical members 15 that is disposed on the most rear side. During this operation, the board relay terminals 22 which are mounted on each LED board 18 are passed through the relay wiring member through recess 31, which is the cutout formed at each corner of the light guide plate 16 (see FIG. 9). The end of the light guide plate 16 that is located outwardly of the end of the liquid crystal panel 11 is supported from the front side, i.e., the lower side in the vertical direction during the assembly, by the frame-shaped light guide plate holding portion 23 on the frame 13. After the light guide plate 16 is mounted, the light guide reflection sheet 20 is directly placed onto the surface 16c that is opposite to the light exit surface 16a of the light guide plate 16.

The relay wiring members 28 include the covered wires 29a and the relay member connectors 29 attached to each end of the covered wire 29a in advance. As illustrated in FIG. 15 and FIG. 17, one of the relay member connectors 29 is connected to the board relay terminals 22 of the LED board 18 from the rear side in the Z-axis direction, i.e., from the chassis 14 side. At this time, since the board relay terminals 22 provided in a pair are arranged on the LED board 18 so as to be symmetric with respect to the rotation center C of the relay member connector 29, the relay member connector 29 may be orientated to any side in the thickness direction of the light guide plate 16. With this configuration, the relay member connector 29 can be connected to the board relay terminals 22 from the rear side with the covered wire 28a extending toward the chassis 14 (the rear side). In the connection operation, the relay member connector 29 is passed through the relay wiring member through recess 31 of the light guide plate 16 such that the relay member connector 29 is connected to the board relay terminals 22.

As illustrated in FIG. 15 and FIG. 17, in the connection operation of the relay member connector 29, the relay member connector 29 is positioned inwardly, in the thickness direction of the LED board 18 (the Y-axis direction), of the end of the LED board 18 on which the board relay terminals 22 are arranged. The relay member connector 29 in such a state is moved toward the LED board 18 (toward the outside), and the retainers 33 sandwich the ends of the LED board 18 from each side in the width direction (the Z-axis direction). When the relay member connector 29 comes in contact with the mount surface 18a of the LED board 18, the elastic contact piece 29b1 of the relay member terminal fitting 29b comes in contact with the board relay terminals 22 (see FIG. 13). At this time, two relay member terminal fittings 29b of the relay member connector 29 are each electrically connected to each board relay terminal 22 of the LED board 18. In this state, since the retainers 33 sandwich the LED board 18 therebetween, the relay member terminal connector 29 is held at the position and hardly slips out.

Figure 10:
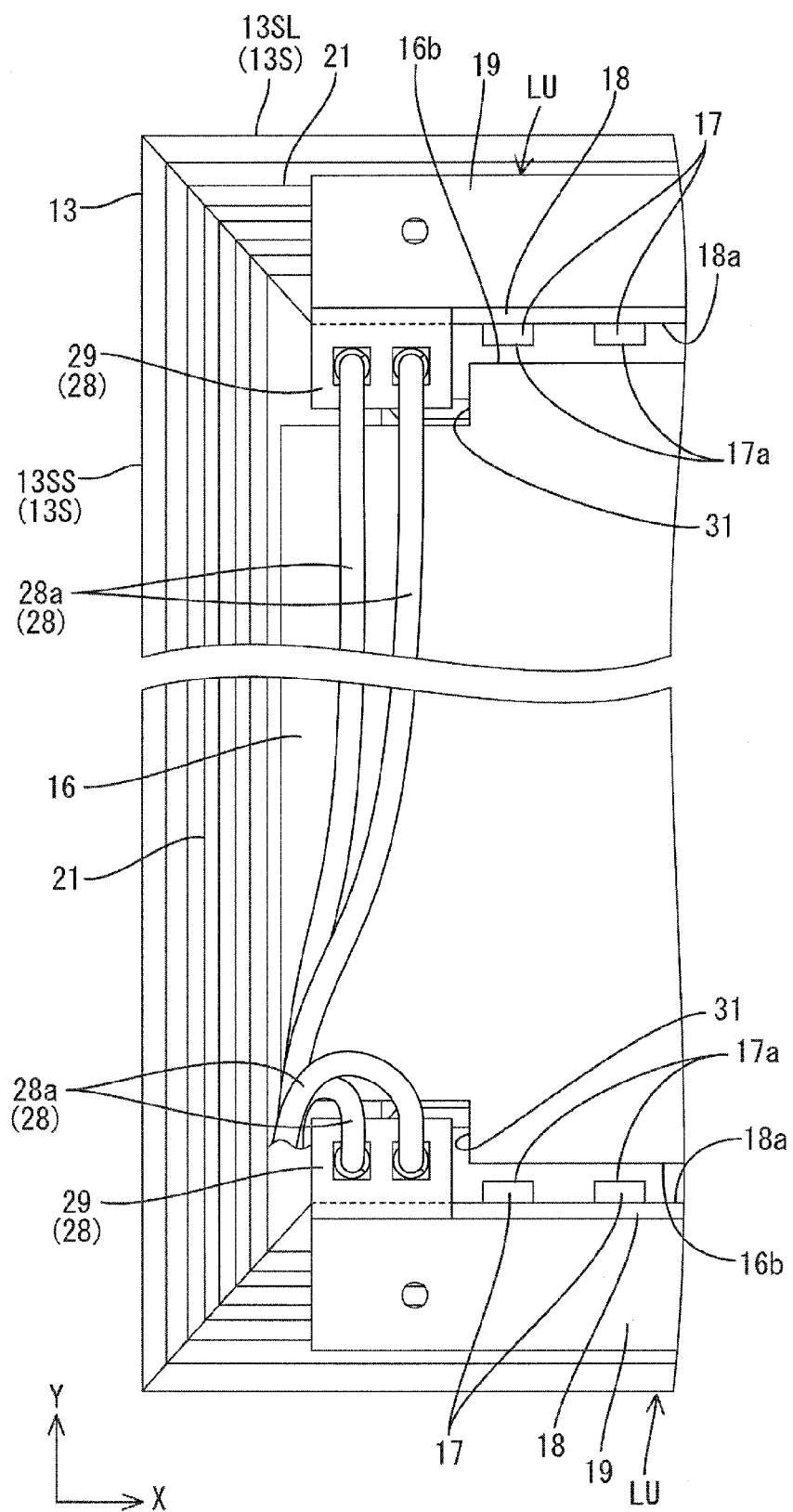
FIG. 10 is a magnified view of the rear view in FIG. 9.

As illustrated in FIG. 10, among the relay wiring members 28 for the respective LED boards 18, the relay wiring member 28 connected to the LED board 18 on the side opposite to the relay member through hole 30 of the chassis 14 overlaps the rear surface of the short-side end of the light guide plate 16 and extends along the frame 13 in the Y-axis direction to the relay member through hole 30. At a position close to the relay member through hole 30, the covered wires 28 of two of the relay wiring members 28 connected to two of the LED boards 18 with the light guide plate 16 therebetween in the short-side direction (two relay wiring members 28 that are arranged on the same side in the long-side direction of the light guide plate 16) are gathered. The above-described mounting operation of the relay member connector 29 included in the relay wiring member 28 may be performed before the mounting operation of the light guide plate 16 or before the mounting operation of the LED unit LU (the LED unit LU on which the relay member connector 29 is attached may be mounted to the frame 13).

After the above-described mounting operation of the liquid crystal panel 11, the optical members 15, the light guide plate 16, the LED unit LU, and the relay wiring member 28 to the frame 13, the mounting operation of the chassis 14 is performed. As illustrated in FIG. 15 and FIG. 17, the chassis 14 is mounted to the frame 13 with the front surface facing the lower side in the vertical direction. Before this mounting operation, it is preferable to pass the other relay member connector 29 of each relay wiring member 28 through the relay member through hole 30 of the chassis 14. The relay wiring members 28 can easily be passed through the wiring through hole 30 on each side in the long-side direction of the chassis 14, because two of four relay wiring members 28 that are arranged on one end of the light guide plate 16 in the long-side direction are gathered together and the other two of four relay wiring members 28 that are arranged on the other end of the light guide plate 16 are gathered together. This improves the workability. In the mounting operation of the chassis 14, the covered wires 28a of the relay wiring members 28 on the rear side of the light guide plate 16 are placed in the space between the light guide plate 16 and the bottom plate 14b5 of the relay member housing 14b2 included in the chassis 14. The outer one of the side plates 14b4 of each LED housing 14b1 included in the chassis 14 is placed in the space between the screw attachment portion 21 and each of the long-side side walls 13b of the frame 13. Accordingly, the chassis 14 is positioned in the Y-axis direction with respect to the frame 13.

In the mounting operation, the head portions of the screw members SM attached to the heat dissipation members 19 and the screw attachment portions 21 in advance are passed through the heat dissipation member screw holes 25B of the LED housings 14b of the chassis 14 (see FIG. 7). Then, the light guide plate receiving portion 14a of the chassis 14 comes into contact with the light guide plate 16 (the light guide reflection sheet 20), the LED attachment portion 14b3 of each LED housing 14b1 come into contact with the heat dissipation portion 19b of each heat dissipation member 19, and the bottom plate 14b5 of each relay member housing 14b2 comes into contact with each screw attachment portion 21. Subsequently, the screw members SM are inserted into the screw holes 25 of the bottom plate 14b5 of each relay member housing 14b2 and the joint screw holes 25A of the bottom plate 14*b*3 of each LED housing 14*b*1 from the rear side. The screw members SM are then fastened in the groove 21*a* of the screw attachment portion 21. The LED units LU and the chassis 14 are fixed to the screw attachment portions 21 by the screw members SM (see FIG. 6 and FIG. 8). In this configuration, the screw members SM are arranged on the rear side of the chassis 14 that provides the rear appearance of the liquid crystal display device 10. Therefore, the screw members SM are hardly recognized from the front side, that is, the user of the liquid crystal display device 10 hardly sees the screw members SM directly. The liquid crystal display device 10 can have an improved design with a simplified appearance.

The mounting operation of the liquid crystal display unit LDU is completed as above. Then, the stand attachments STA and the boards PWB, MB, and CTB are mounted to the rear side of the liquid crystal display unit LDU. To the board connector PWBC included in the power source board PWB, the other relay member connector 29 of the relay wiring member 28 that is led out of the relay member through hole 30 of the chassis 14 is fitted. This allows the drive power from the power source board PWB located outside the chassis 14 to be sent to the LEDs 17 on the LED board 18 via the relay wiring member 28. Then, the stand ST and the cover CV are attached to the liquid crystal display unit LDU. Thus, the liquid crystal display device 10 and the television device TV are produced. The appearance of the liquid crystal display device 10 produced as above is provided by the frame 13 that holds the liquid crystal panel 11 from the display surface 11*c* side and the chassis 14 that constitutes the backlight unit 12. Further, the liquid crystal panel 11 and the optical members 15 are placed on top of one another directly. In some conventional liquid crystal display devices, a cabinet that is made of synthetic resin may be provided separately from the frame 13 and the chassis 14 or a panel receiving member may be arranged between the liquid crystal panel 11 and the optical members 15 such that the liquid crystal panel 11 and the optical members 15 are not in contact with each other. Compared to such a configuration, the production cost can be reduced because the numbers of components and assembly steps are reduced. Furthermore, the thickness and weight of the liquid crystal display device 10 can be reduced.

When the liquid crystal display device 10 produced as above is turned on, as illustrated in FIG. 4, the power source board PWB starts to supply power. Followed by the power supply, the control board CTB sends signals to the liquid crystal panel 11 via the printed circuit board 27 and the flexible board 26 (a driver DR) and controls driving of the liquid crystal panel 11. The LEDs 17 included in the backlight unit 12 are also driven. Light from each LED 17 is guided by the light guide plate 16 toward the optical members 15. The light that has passed through the optical members 15 is a planar light having an even brightness and is applied to the liquid crystal panel 11. As a result, predetermined images are displayed on the liquid crystal panel 11. Hereinafter, operations of the backlight unit 12 will be described in detail. As illustrated in FIG. 6, when the LED 17 is turned on, light emitted from the LED 17 enters the light guide plate 16 from the light entrance surface 16*b*. The light in the light guide plate 16 from the light entrance surface 16*b* may be totally reflected at an interface of the light guide plate 16 with an outer air layer, or reflected by the light guide reflection sheet 20. The light thus travels throughout the light guide plate 16. The light is reflected and scattered by reflection portions or scattering portions, which are not illustrated, of the light guide plate 16 and exits the light guide plate 16 from the light exit surface 16*a* toward the optical members 15.

As described above, the backlight unit (the lighting device) 12 of this embodiment includes the LED (the light source) 17, the light guide plate 16 including the light entrance surface 16*b* facing the LED 17 and the light exit surface 16*a*, the LED boards 18 each including the plate surface facing the light entrance surface 16*b* and on which the LED 17 is mounted, and the relay wiring member (the relay member) 28 electrically connecting between the board relay terminals 22 and the power source board (the power source) PWB. The light emitted from the LED 17 enters the light guide plate 16 through the light entrance surface 16*b* and exits through the light exit surface 16*a*. The light source boards 18 each includes the board relay terminals 22 configured to relay power to the LED 17. The board relay terminals 22 are arranged such that the relay wiring member 28 that is orientated to either one of sides in the thickness direction of the light guide plate 16 is allowed to be connected to the board relay terminals 22.

In this configuration, the light emitted from the LEDs 17 mounted on the LED boards 18 enters the light guide plate 16 through the light entrance surface 16*b* thereof and travels inside the light guide plate 16. Then, the light exits from the light entrance surface 16*a*. The relay wiring member 28 is connected to the board relay terminals 22 on the LED board 18 to supply the power from the power source board PWB to the LEDs 17, since. The board relay terminals 22 are arranged such that the relay wiring members 28 that are orientated to either one of sides in the thickness direction of the light guide plate 16 is allowed to be connected to the board relay terminals 22. In this configuration, the relay wiring members 28 orientated to the same direction can be connected to the board relay terminals 22 on each LED board 18, which has the plate surface facing the light entrance surface 16*b* of the light guide plate 16, orientated to either direction with respect to the light guide plate. With this configuration, the relay wiring members 28 can be orientated to the same direction for connection, and the number of kinds of LED boards 18 can be reduced because the LED boards 18 having the same configuration can be used. Therefore, the production cost can be reduced.

The board relay terminals 22 are arranged on the plate surface of the LED board 18 so as to be symmetric with respect to the rotation center C of the relay wiring member 28. With this configuration, the relay member 28 can be connected to the board relay terminals 22 with the relay member 28 orientated to either side in the thickness direction of the light guide plate 16, since the board relay terminals 22 are arranged on the plate surface of the LED board 18 so as to be symmetric with respect to the rotation center C of the relay wiring member 28.

The board relay terminals 22 are connected to the relay wiring members 28 that are all oriented to one side in the thickness direction of the light guide plate 16. With this configuration, the number of board relay terminals 22 can be reduced and an area of the plate surface of the LED board 18 that is occupied by the board relay terminals 22 can be smaller, compared to a case in which two different kinds of board relay terminals are provided. Two different kinds of board relay terminals include board relay terminals to which the relay wiring members 28 orientated to one side in the thickness direction of the light guide plate 16 are connected and board relay terminals to which the relay wiring members 28 orientated to the other side in the thickness direction are connected. The above configuration facilitates the reduction in the size of the LED board 18.

The board relay terminals 22 included in each LED board 18 are arranged such that a line segment LS connecting the board relay terminals 22 is inclined with respect to the thickness direction of the light guide plate 16. In this configuration, the distance between the board relay terminals 22 is longer than a distance between the board relay terminals that are arranged in the thickness direction of the light guide plate 16. In the production of the LED board 18, the board relay terminals 22 of this configuration are less likely to be shorted, and thus a yield rate of the LED boards 18 is improved.

The LED board 18 is sandwiched between the retainers 33 included in the relay wiring member 28 from the front and rear sides of the light guide plate 16. With this configuration, the relay wiring member 28 can be held onto the LED board 18, since the retainers 33 sandwich the LED board 18 from the front and rear side of the light guide plate 16.

The board relay terminals 22 are located on an end of each of the LED boards 18. At least two of the LED boards 18 are arranged symmetric with respect to the center line CL1, CL2 of the light guide plate 16. The center line CL1, CL2 extends along one of sides of the light guide plate 16. When the at least two LED boards 18 having the board relay terminals 22 on the end thereof are arranged symmetric with respect to the center line CL1, CL2 of the light guide plate 16, the board relay terminals 22 may be arranged such that only the relay wiring member 28 that is orientated to one direction is allowed to be connected. In such a case, two different kinds of LED board 18 need to be provided. However, with the above configuration, only one kind of LED board 18 needs to be provided, since the board relay terminals 22 are arranged such that the relay wiring member 28 that is orientated to either side in the thickness direction of the LED board 18 is allowed to be connected. Therefore, the production cost can be reduced.

At least two of the LED boards 18 are arranged along a side of the light guide plate 16. The LED boards 18 each include the board relay terminals 22 on the end thereof in the direction along the side of the light guide plate 16. With this configuration, the relay wiring member 28 connected to the board relay terminals 22 hardly blocks the light emitted from the LED 17 and traveling to the light entrance surface 16b, since the board relay terminals 22 on the LED boards 18 that are arranged along the side of the light guide plate 16 are located on the end of the LED boards 18 in the direction along the side of the light guide plate 16. Therefore, uneven brightness is reduced. Further, the backlight unit 12 can have a larger size easily by arranging two or more LED boards 18 along the side of the light guide plate 16.

The at least two of the LED boards 18 are arranged on opposite sides of the light guide plate 16 such that the light guide plate 16 is disposed therebetween in a direction along a side of the light guide plate 16. The board relay terminals 22 of one of the LED boards 18 face the board relay terminals 22 of another one of the LED boards 18 with the light guide plate 16 therebetween. In this configuration, the relay wiring members 28 that are connected to the board relay terminals 22 are all located on one end of the light guide plate 16, since the board relay terminals 22 on one of the LED boards 18, which are arranged on opposite sides of the light guide plate 16 such that the light guide plate 16 is disposed therebetween in the direction along the side of the light guide plate 16, face the board relay terminals 22 of another one of the LED boards 18 with the light guide plate 16 therebetween. This configuration facilitates the connection of the relay wiring members 22 to the power source board PWB.

The LED board 18 includes the board relay terminals 22 on the mount surface 18a thereof on which the LED 17 is mounted. The light guide plate 16 includes a relay wiring member through recess 31. The relay wiring member through recess 31 is a cutout through which the relay wiring member 28 connected to the board relay terminals 22 passes. In this configuration, the relay wiring member 28 connected to the board relay terminals 22, which is on the mount surface 18a of the LED board 28 on which the LED 17 is mounted, passes through the relay wiring member through recess 31 that is the cutout formed in the light guide plate 16. Thus, a distance between the LED 17 on the LED board 18 and the light entrance surface 16b of the light guide plate 16 can be short compared to a configuration in which the light guide plate 16 does not include the relay wiring member through recess 31. This improves light entrance efficiency of the light emitted from the LED 17 and traveling to the light entrance surface 16b. Therefore, brightness can be improved or the power consumption can be reduced.

The relay wiring member through recess 31 is the cutout at a corner of the light guide plate 16. With this configuration, the size of the light guide plate 16 can be minimized, and thus the frame of the backlight unit 12 can have a smaller size, since the relay wiring member through recess 31 is the cutout at a corner of the light guide plate 16.

The backlight unit 12 further includes the chassis 14 housing the LED board 18 and the light guide plate 16. The chassis 14 is arranged such that the surface thereof facing the light guide plate 16 and the LED board 18 is located on the side opposite to the light exit surface 16a. The power source board PWB is arranged outside the chassis 14. The relay wiring member 28 is connected to the board relay terminals 22 from the chassis 14 side. With this configuration, the relay wiring members 28 can be easily connected to the power source board PWB and the board relay terminals 22, since the relay wiring members 28 that are connected to the power source board PWB, which is located outside the chassis 14, are connected to the board relay terminals 22 from the chassis 14 side.

Second Embodiment

A second embodiment of the present invention will be described with reference to FIG. 18 and FIG. 19. In the second embodiment, an LED board 118 and a relay member connector 129 include a projection and recess joint 34. The other constructions, advantages, and effects same as those in the first embodiment will not be described.

Figure 18:
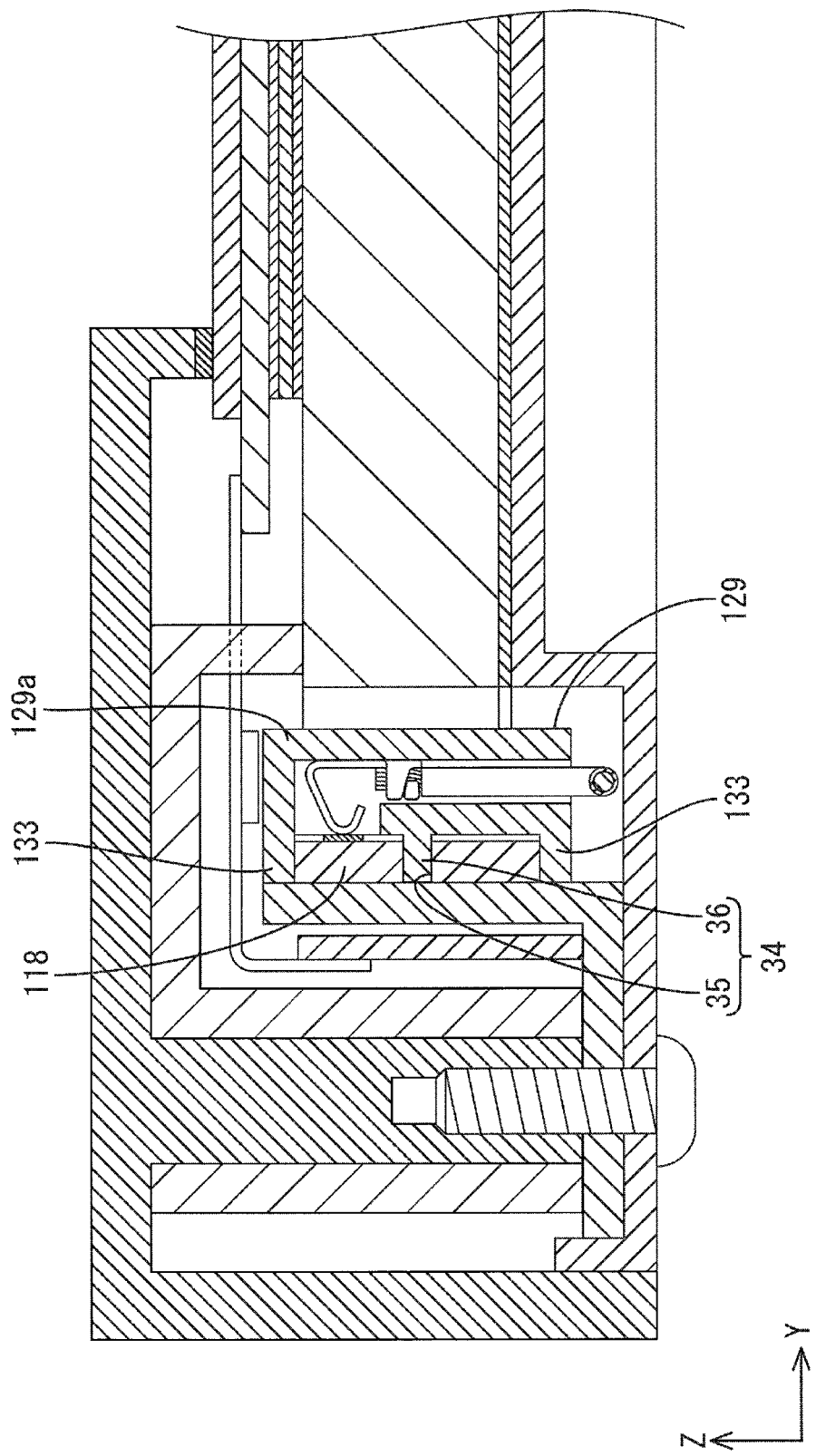
FIG. 18 is a cross-sectional view illustrating a cross-sectional configuration of an LED board and a relay member connector according to a second embodiment of the present invention.
Figure 19:
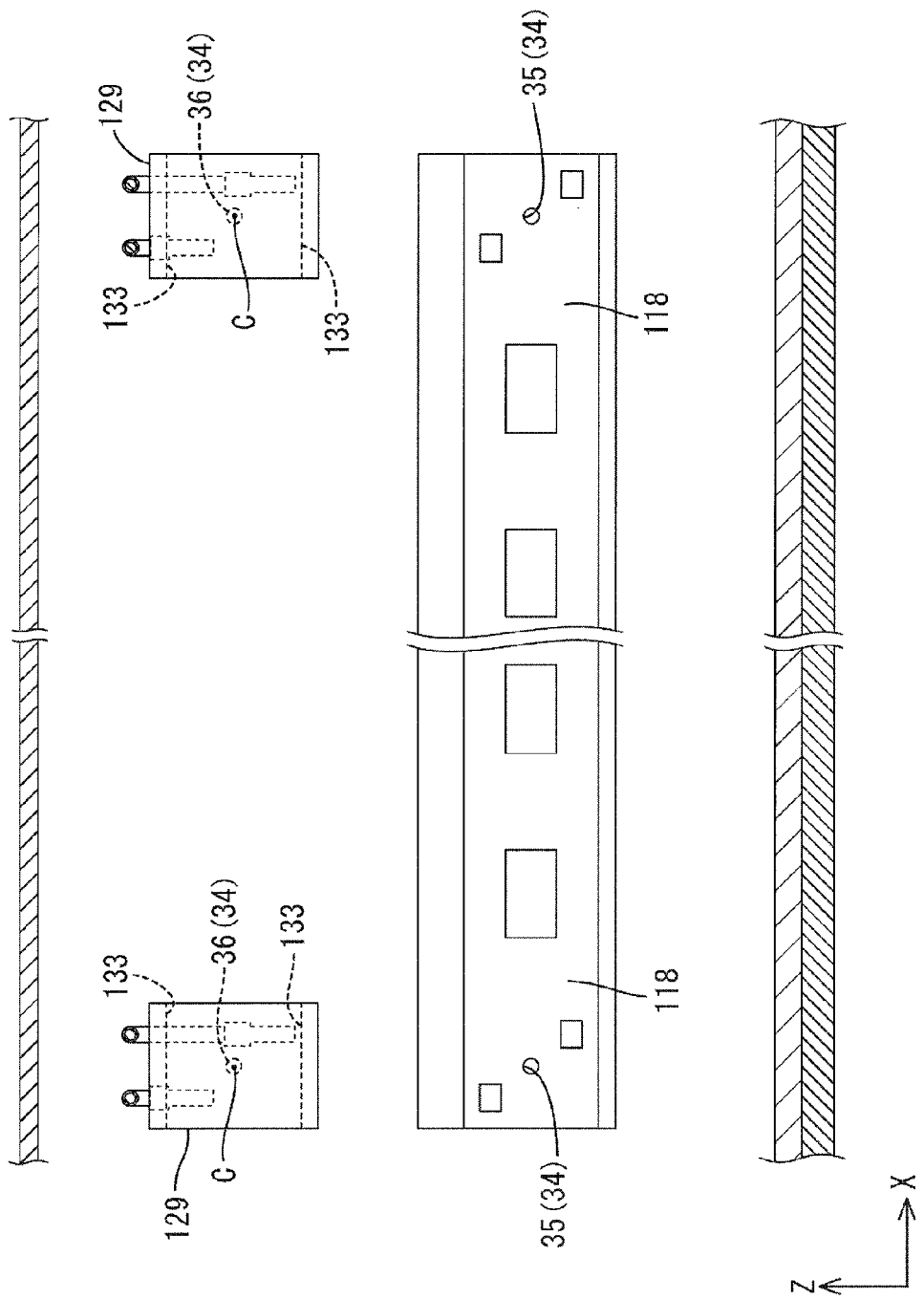
FIG. 19 is a front cross-sectional view illustrating a state before the LED boards and the relay member connectors are connected to each other.

As illustrated in FIG. 18 and FIG. 19, a plate surface of the LED board 118 and a surface of the relay member connector 129 that faces the plates surface of the LED board 118 include the projection and recess joint 34. The projection and recess joint 34 includes a fitting recess 35 that is included in the LED board 118 and a fitting protrusion 36 that is included in the relay member connector 129. The fitting recess 35 and the fitting protrusion 36 are fitted with each other. The fitting recess 35 is a hole that extends through the LED board 118 in the thickness direction of the LED board 118. The fitting recess 35 is located on the plate surface of the LED board 118 at a position concentric with the rotation center C of the connected relay member connector 129. In FIG. 19, the relay member connector 129 is not connected such that both of the fitting recess 35 and the fitting protrusion 36 can be seen. The fitting protrusion 36 is integrally formed with a relay member connector housing 129a included in the relay member connector 129. The fitting protrusion 36 protrudes from a surface of the relay member connector housing 129a that faces the LED board 118 toward the LED board 118. The fitting protrusion 36 is positioned concentric with the rotation center C of the relay member connector 129. The fitting recess 35 and the fitting protrusion 36 each have a circular shape in a front view and have substantially the same diameter. With this configuration, the fitting protrusion 36 is tightly fitted to the fitting recess 35, and thus a predetermined retention can be obtained. The relay member connector 129 can remain attached to the LED board 118 by the projection and recess joint 34, in addition to the retainers 33 described in the first embodiment.

As described above, according to this embodiment, the plate surface of the LED board 118 and the surface of the relay wiring member that faces the plate surface of the LED board 118 include the projection and recess joint 34, which includes the fitting protrusion and the fitting recess that are fitted with each other. With this configuration, the relay wiring member can remain held onto the LED board 118 by fitting the fitting protrusion and the fitting recess of the projection and recess joint 34.

Third Embodiment

A third embodiment of the present invention will be described with reference to FIG. 20. The third embodiment includes a plurality of projection and recess joints 234 each of which has the same configuration as that of the second embodiment. The other constructions, advantages, and effects same as those in the second embodiment will not be described.

Figure 20:
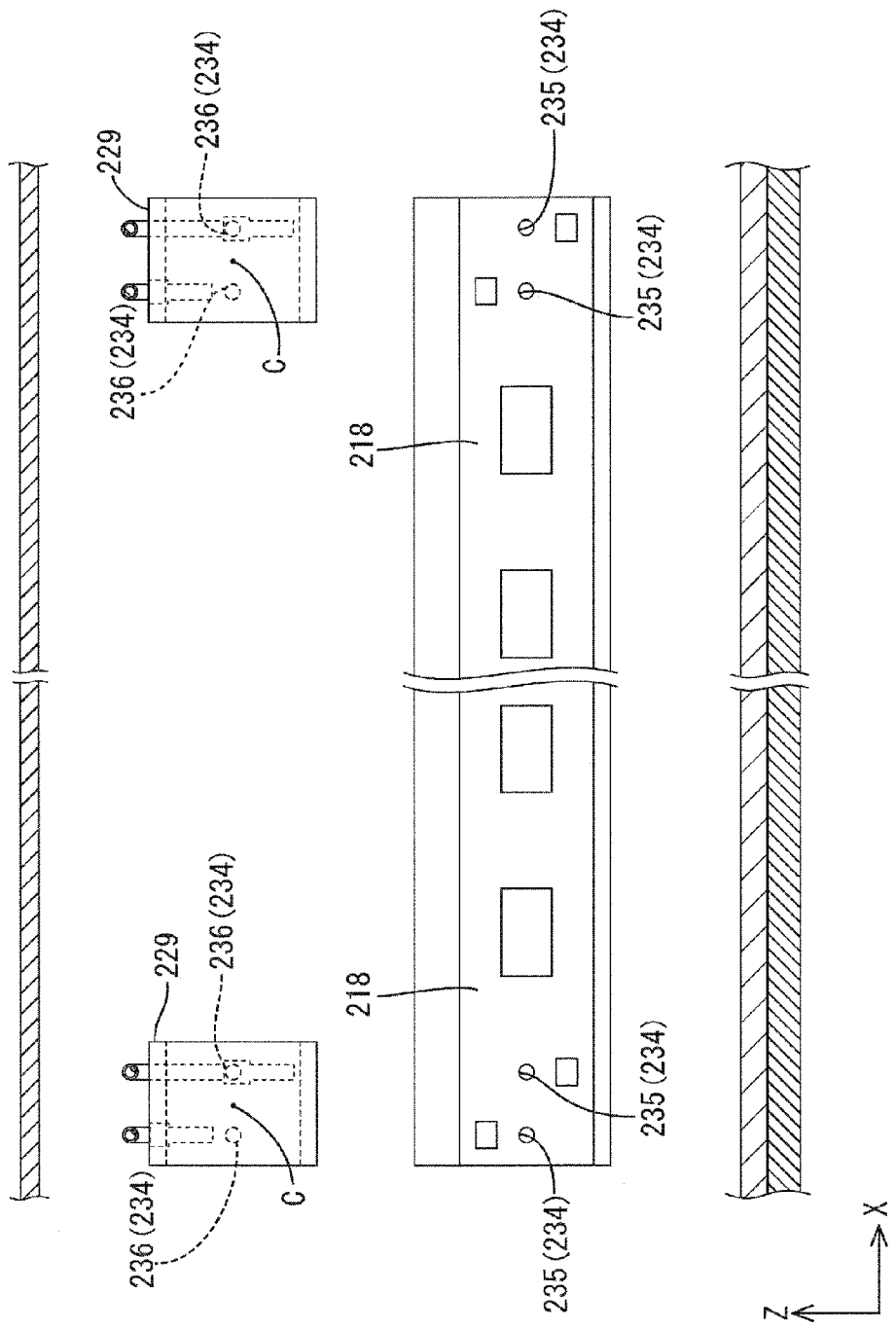
FIG. 20 is a front cross-sectional view illustrating a state before LED boards and relay member connectors according to a third embodiment of the present invention are connected to each other.

As illustrated in FIG. 20, a plate surface of the LED board 218 and a surface of the relay member connector 229 that faces the LED board 218 include two projection and recess joints 234. The projection and recess joints 234 include two fitting recesses 235 and two fitting protrusions 236 that are away from each other in the X-axis direction at positions away from the rotation center C of a relay member connector 229. With this configuration, the rotation of the relay member connector 229 is regulated after each of the projection and recess joints 234 is fitted to attach (connect) the relay member connector 229 to the end of the LED board 218. In other words, with this configuration, the relay member connector 229 hardly rotates.

As described above, according to this embodiment, the plate surface of the LED board 218 includes multiple projection and recess joints 234. With this configuration, the relay wiring member hardly rotates against the LED board 218 and the retention can be improved.

Fourth Embodiment

A fourth embodiment of the present invention will be described with reference to FIG. 21. In the fourth embodiment, board relay terminals 322 are arranged differently from those in the second embodiment. The other constructions, advantages, and effects same as those in the second embodiment will not be described.

Figure 21:
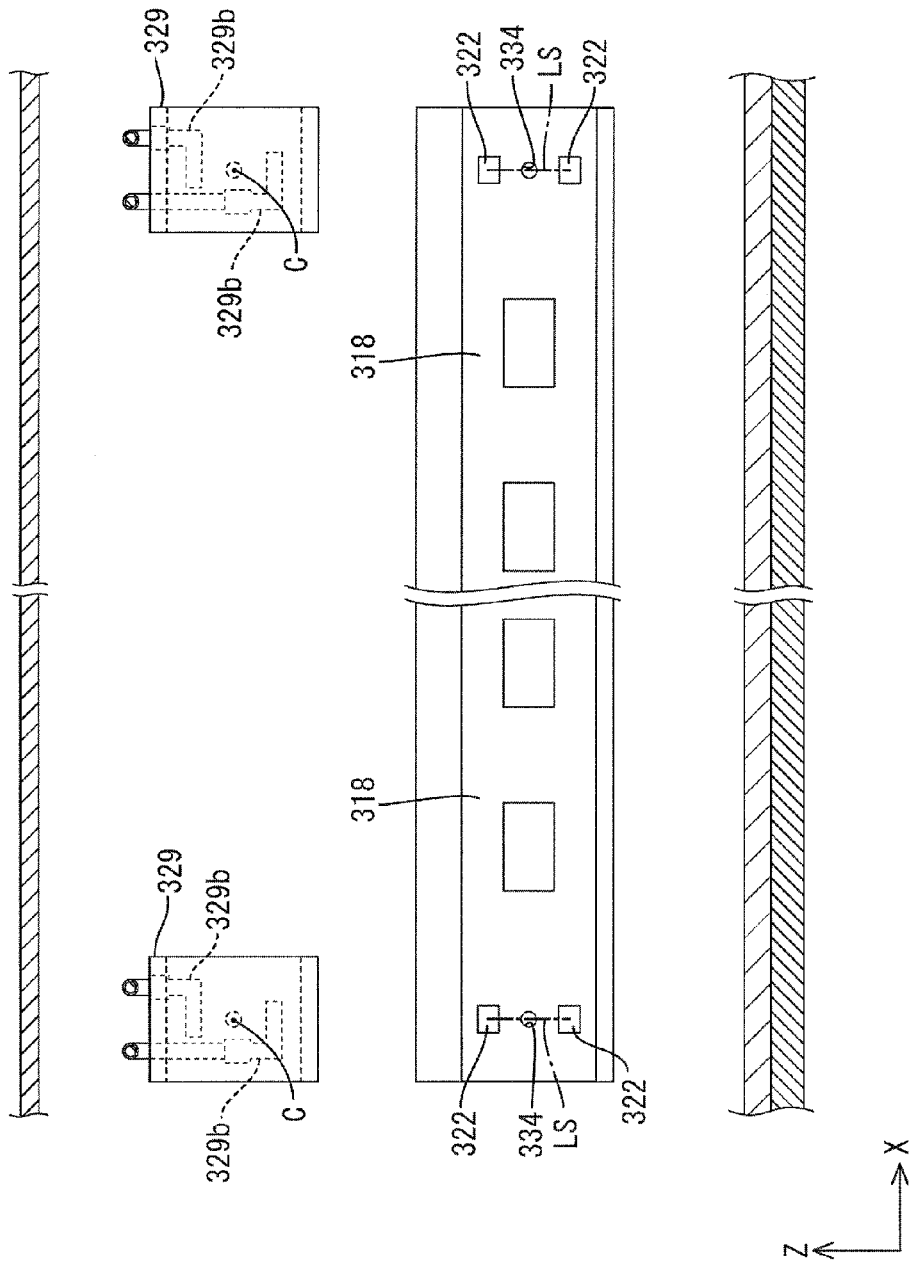
FIG. 21 is a front cross-sectional view illustrating a state before the LED boards and the relay member connectors according to a fourth embodiment of the present invention are connected to each other.

As illustrated in FIG. 21, two board relay terminals 322 are arranged in a line in the Z-axis direction (the thickness direction of the light guide plate 16, which is not illustrated) and symmetric with respect to the rotation center C of the connected relay member connector 329. A line segment LS connecting centers of the board relay terminals 322 extends in the Z-axis direction, i.e., in the thickness direction of the light guide plate 16. The center of the line segment LS corresponds to the center of a fitting recess 334 (the rotation center C of the connected relay member connector 329). Two relay member terminal fittings 329b are arranged so as to correspond to the board relay terminals 322. In FIG. 21, the line segment LS is indicated by a two-dotted chain line.

Fifth Embodiment

A fifth embodiment of the present invention will be described with reference to FIG. 22. In the fifth embodiment, an arrangement of board relay terminals 422 is changed from that in the second embodiment. The other constructions, advantages, and effects same as those in the second embodiment will not be described.

Figure 22:
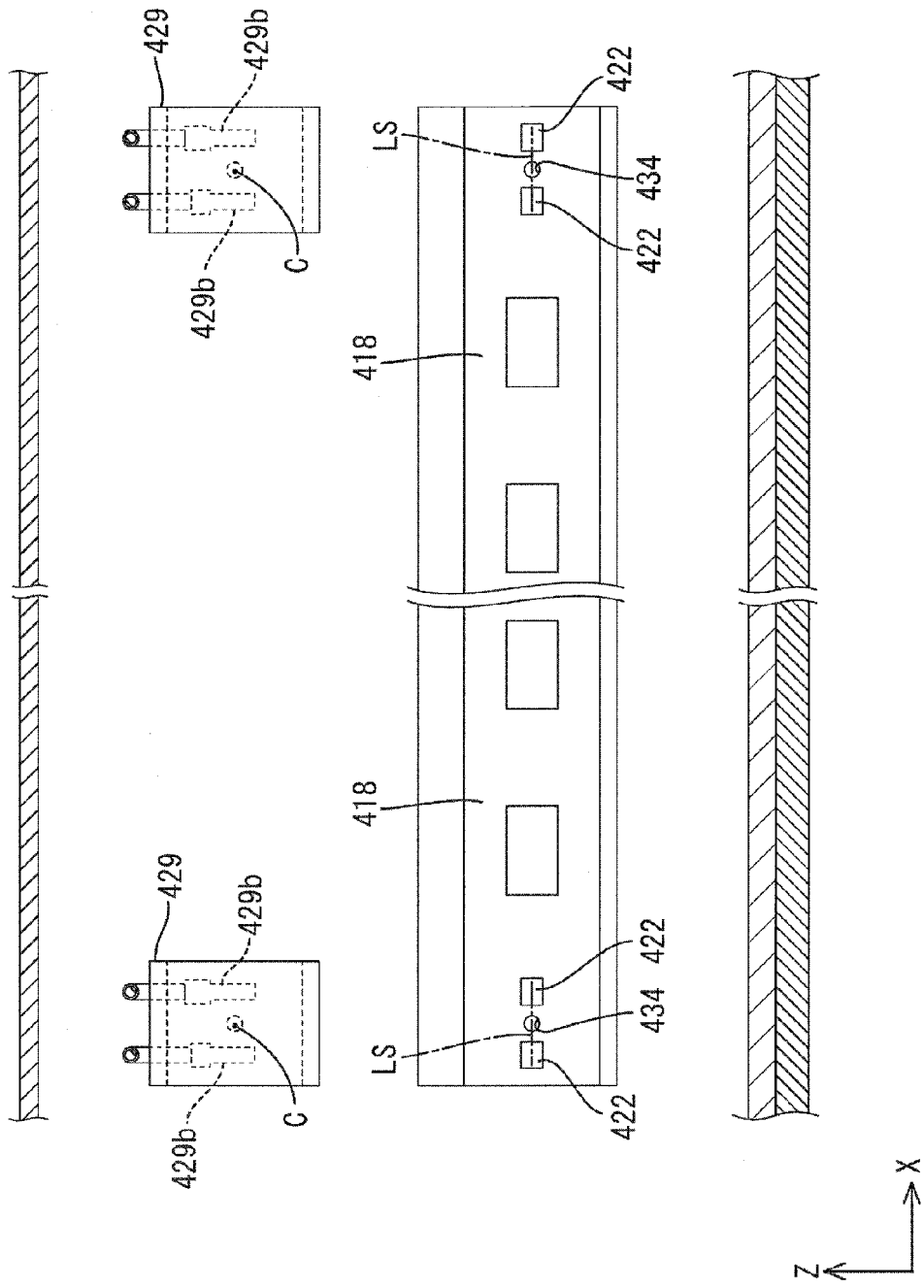
FIG. 22 is a front cross-sectional view illustrating a state before the LED boards and the relay member connectors according to a fifth embodiment of the present invention are connected to each other.

As illustrated in FIG. 22, two board relay terminals 422 are arranged in a line in the X-axis direction (an arrangement direction of LEDs 417) and symmetric with respect to the rotation center C of the connected relay member connector 429. A line segment LS connecting centers of the board relay terminals 422 extends in the X-axis direction, i.e., in the arrangement direction of the LEDs 417 on the LED board 418. The center of the line segment LS corresponds to the center of a fitting recess 434 (the rotation center C of the connected relay member connector 429). Two relay member terminal fittings 429b are arranged so as to correspond to the board relay terminals 422. In FIG. 22, the line segment LS is indicated by a two-dotted chain line.

Sixth Embodiment

A sixth embodiment of the present invention will be described with reference to FIG. 23. In the sixth embodiment, an arrangement of LED boards 518 is changed from that in the first embodiment. The other constructions, advantages, and effects same as those in the first embodiment will not be described.

Figure 23:
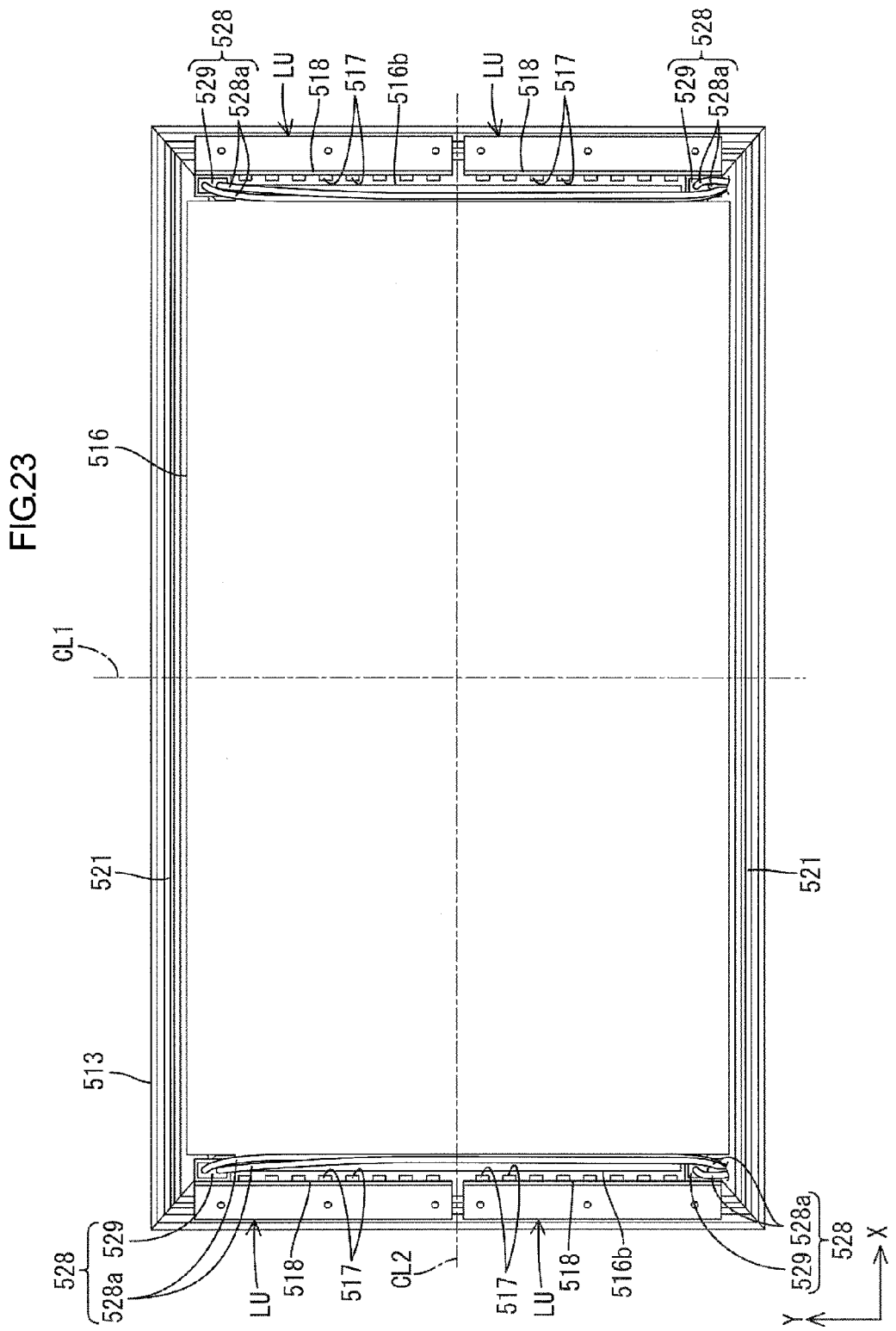
FIG. 23 is a rear view illustrating a liquid crystal display device according to a sixth embodiment of the present invention. The chassis is not illustrated.

As illustrated in FIG. 23, the LED boards 518 according to this embodiment are arranged with the light guide plate 516 therebetween in the long-side direction (the X-axis direction). The LED boards 518 each extend in the short-side direction of the light guide plate 516 and on each of which LEDs 517 are arranged so as to be away from each other in the long-side direction of the LED board 518 (the Y-axis direction). On an end of the LED board 518 in the long-side direction of the LED board 518, board relay terminals 522 are arranged. An outer end surface of the light guide plate 516 includes two end surfaces extending in the short-side direction. Each of the end surfaces is a light entrance surface 516 that faces the LEDs 517 on the LED board 518.

The LED boards 518 that are arranged in the short-side direction of the light guide plate 516 and that are arranged with the light guide plate 516 therebetween in the long-side direction are symmetric with respect to the center lines CL1, CL2 that extend along the sides of the light guide plate 516. Specifically, two LED boards 518 that are arranged in the short-side direction of the light guide plate 516 are symmetric with respect to the center line CL2 that extends in the long-side direction. Each LED board 518 includes the board relay terminals (not illustrated) on the end thereof in the short-side direction of the light guide plate 518. The LED boards 518 that are arranged with the light guide plate 516 therebetween in the long-side direction are symmetric with respect to the center line CL1 that extends in the short-side direction. The LED boards 518 each include the board relay terminals such that the board relay terminals of one of the LED boards 518 face the board relay terminals of the other one of the LED boards 518 with the light guide plate 516 therebetween. In the above arrangement of the LED boards 518, the board relay terminals are arranged such that the relay member connector 529 that is orientated to either side in the thickness direction of the light guide plate 516 is allowed to be connected to the board relay terminals. Accordingly, the relay member connectors 529 can be orientated to the same direction for connection, and the LED boards 518 that are arranged symmetric with respect to the center lines CL1, CL2 can have the same configuration. Only one kind of LED board 518 needs to be provided.

Covered wires 528*a* of the relay wiring member 528 connected to each board relay terminal are arranged on the rear side of the short-side end of the light guide plate 516, i.e., the end having the light entrance surface 516*b*. The covered wires 528*a* extend in a space defined by the light entrance surface 516*b* and the housing 14*b* on the short-side end of the chassis 14, which is not illustrated. Thus, a wiring route of the covered wires 528*a* is provided. In other words, the housing 14*b* on each short-side end of the chassis 14 houses the relay wiring member 528 in addition to the LED unit LU. On each long-side end of the chassis 14, a screw attachment portion 521 of a frame 513 is attached.

Seventh Embodiment

A seventh embodiment of the present invention will be described with reference to FIG. 24. In the seventh embodiment, an arrangement of LED boards 618 is changed from that in the first embodiment. The other constructions, advantages, and effects same as those in the first embodiment will not be described.

Figure 24:
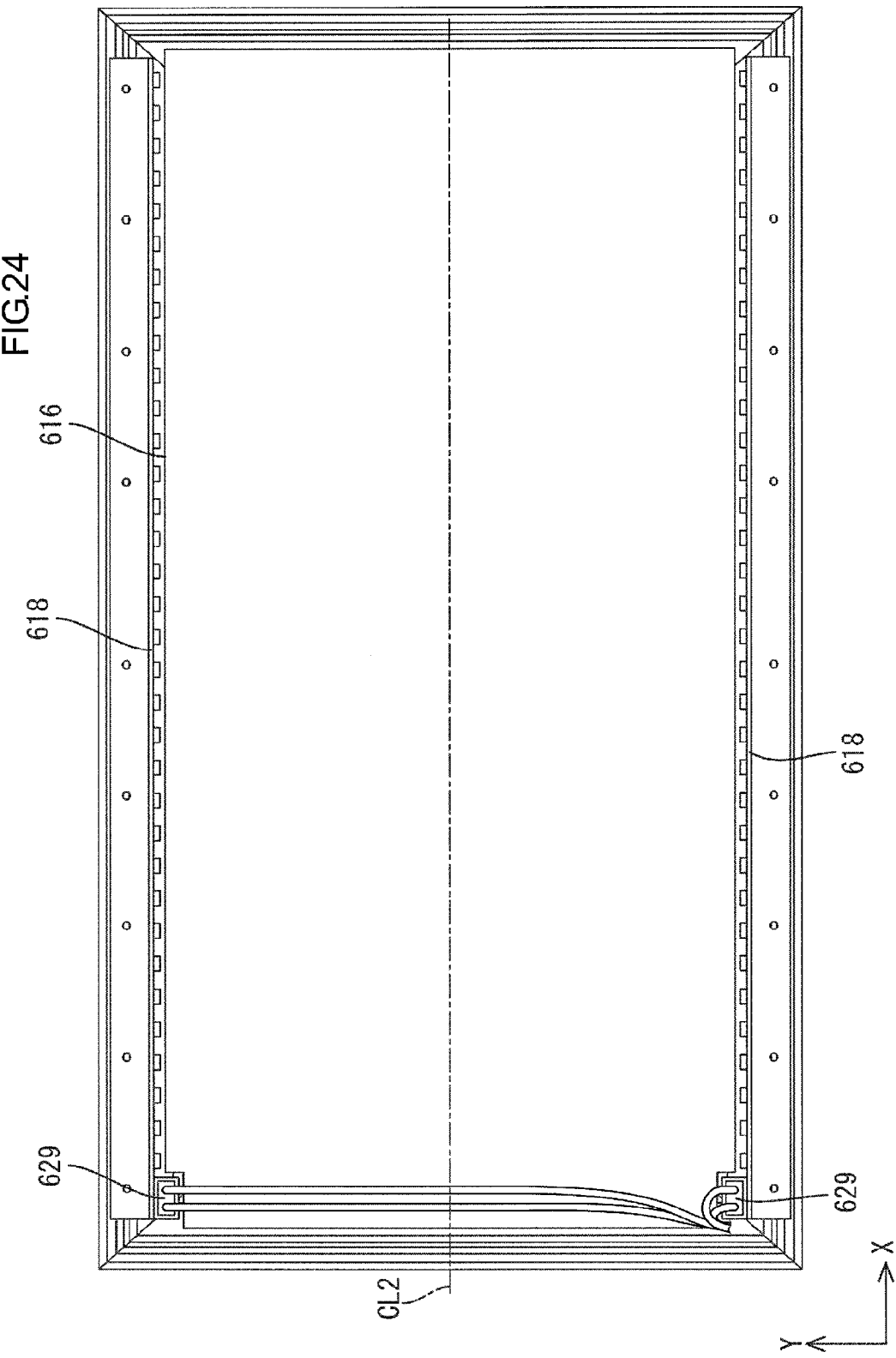
FIG. 24 is a rear view illustrating a liquid crystal display device according to a seventh embodiment of the present invention. The chassis is not illustrated.

As illustrated in FIG. 24, according to this embodiment, only two LED boards 618 are arranged with a light guide plate 616 therebetween in the short-side direction (the Y-axis direction). Specifically, the LED boards 618 are provided in a pair with the light guide plate 616 therebetween in the short-side direction and arranged symmetric with respect to the center line CL2 that extends in the long-side direction of the light guide plate 616. The LED boards 618 each include board relay terminals (not illustrated) on one end thereof in the long-side direction of the light guide plate 616. The board relay terminals of one of the LED boards 618 face the board relay terminals of the other one of the LED boards 618 with the light guide plate 616 therebetween. In the above arrangement of the LED boards 618, the board relay terminals are arranged such that the relay member connector 629 that is orientated to either side in the thickness direction of the light guide plate 616 is allowed to be connected to the board relay terminals. Accordingly, the relay member connectors 629 can be orientated to the same direction for connection, and the LED boards 618 that are arranged symmetric with respect to the center line CL2 can have the same configuration. Only one kind of LED board 618 needs to be provided.

Eighth Embodiment

An eighth embodiment of the present invention will be described with reference to FIG. 25. In the eighth embodiment, an arrangement of LED boards 718 is changed from that in the first embodiment. The other constructions, advantages, and effects same as those in the second embodiment will not be described.

Figure 25:
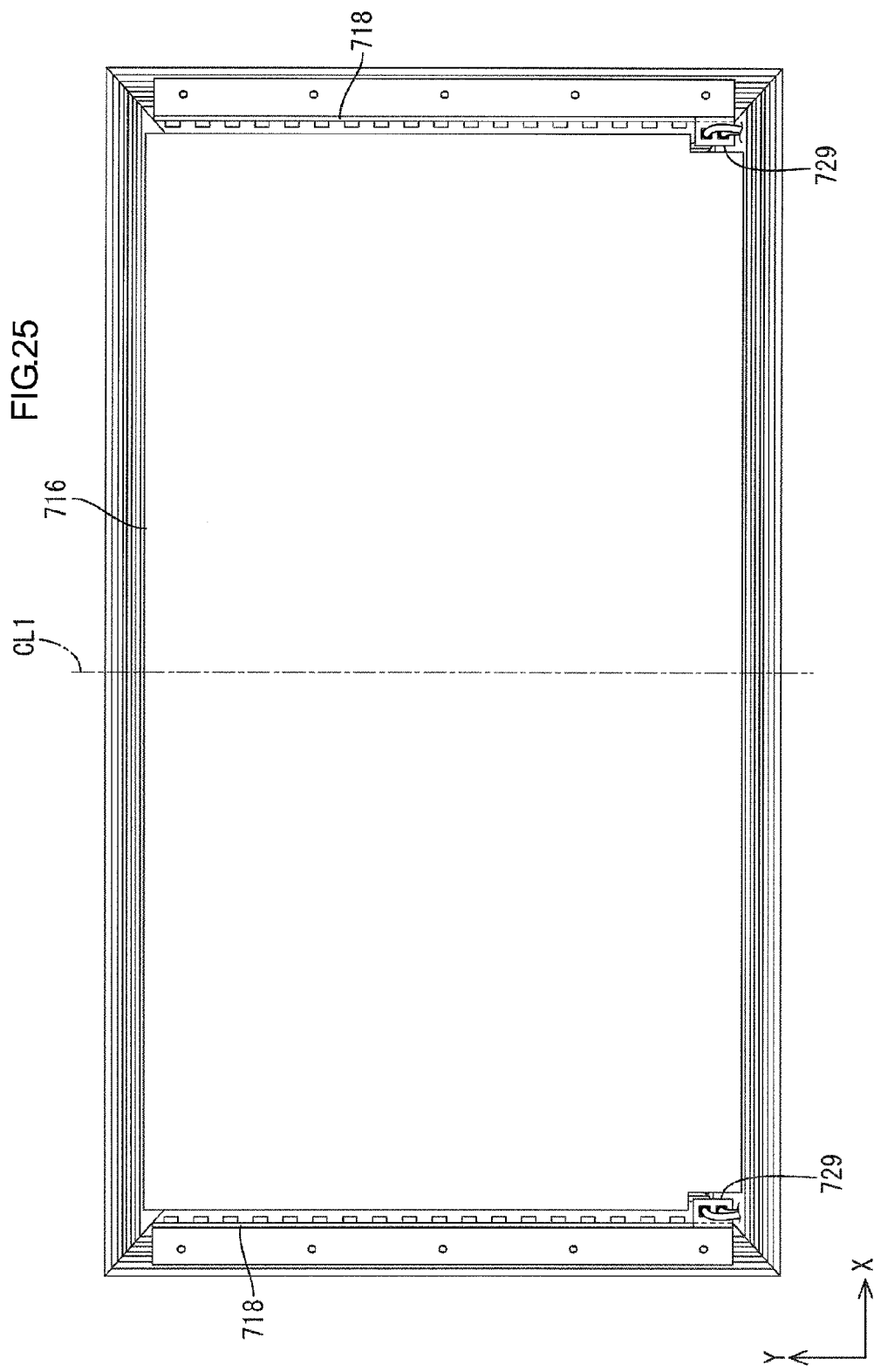
FIG. 25 is a rear view illustrating a liquid crystal display device according to an eight embodiment of the present invention. The chassis is not illustrated.

As illustrated in FIG. 25, according to this embodiment, only two LED boards 718 are arranged with a light guide plate 716 therebetween in the long-side direction (the X-axis direction). Specifically, the LED boards 718 are provided in a pair with the light guide plate 716 therebetween in the long-side direction and arranged symmetric with respect to the center line CL1 that extends in the short-side direction of the light guide plate 716. The LED boards 718 each include board relay terminals (not illustrated) on one end thereof in the short-side direction of the light guide plate 716. The board relay terminals of one of the LED boards 718 face the board relay terminals of the other one of the LED boards 718 with the light guide plate 716 therebetween. In the above arrangement of the LED boards 718, the board relay terminals are arranged such that the relay member connector 729 that is orientated to either side in the thickness direction of the light guide plate 716 is allowed to be connected to the board relay terminals. Accordingly, the relay member connectors 729 can be orientated to the same direction for connection, and the LED boards 718 that are arranged symmetric with respect to the center line CL1 can have the same configuration. Only one kind of LED board 718 needs to be provided.

Ninth Embodiment

A ninth embodiment of the present invention will be described with reference to FIG. 26. In the ninth embodiment, an arrangement of LED boards 818 is changed from that in the first embodiment. The other constructions, advantages, and effects same as those in the second embodiment will not be described.

Figure 26:
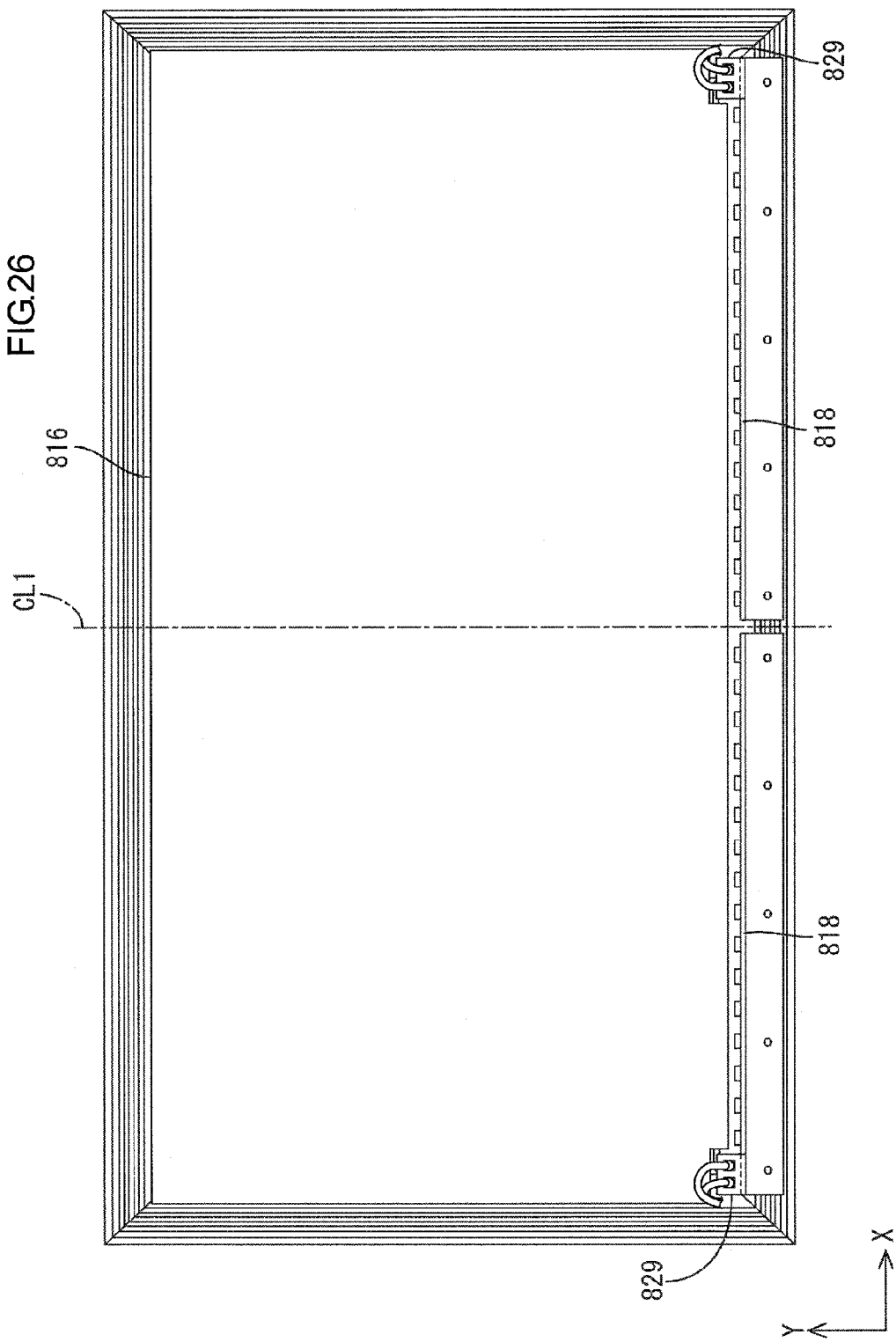
FIG. 26 is a rear view illustrating a liquid crystal display device according to a ninth embodiment of the present invention. The chassis is not illustrated.

As illustrated in FIG. 26, according to this embodiment, only two LED boards 818 are arranged in the long-side direction of a light guide plate 816. Specifically, the LED boards 818 are symmetric with respect to the center line CL 1 that extends in the short-side direction of the light guide plate 816. The LED boards 818 each include board relay terminals (not illustrated) on an end thereof in the short-side direction of the light guide plate 816. In the above arrangement of the LED boards 818, the board relay terminals are arranged such that the relay member connector 829 that is orientated to either side in the thickness direction of the light guide plate 816 is allowed to be connected to the board relay terminals. Accordingly, the relay member connectors 829 can be orientated to the same direction for connection, and the LED boards 818 that are arranged symmetric with respect to the center lines CL1, CL2 can have the same configuration. Only one kind of LED board 818 needs to be provided.

Tenth Embodiment

A tenth embodiment of the present invention will be described with reference to FIG. 27 or FIG. 28. In the tenth embodiment, a panel receiving member 37 that receives a liquid crystal panel 911 from the rear side is provided, and an orientation of wiring member connector 929 is changed. The other constructions, advantages, and effects same as those in the first embodiment will not be described.

Figure 27:
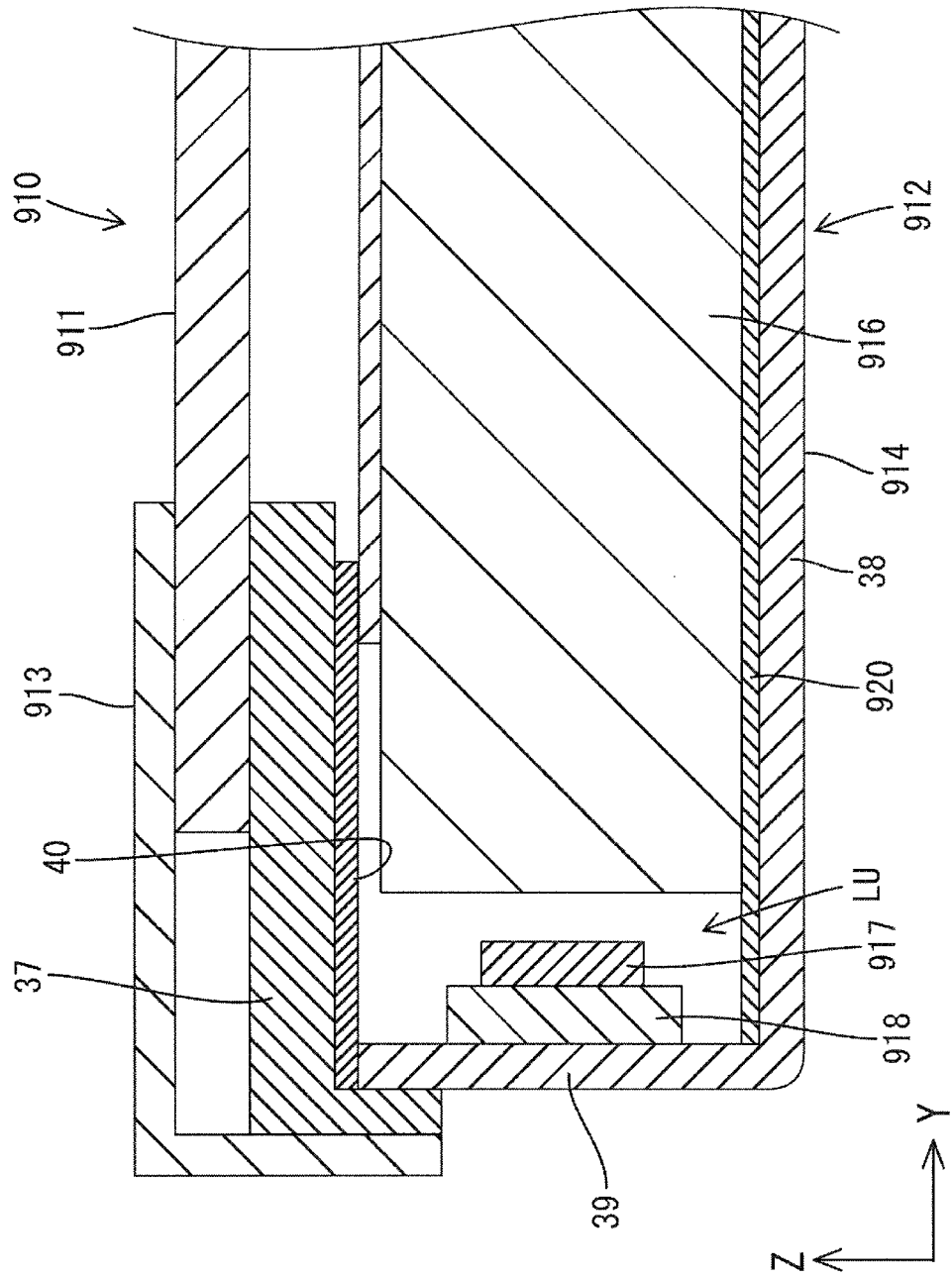
FIG. 27 is a cross-sectional view illustrating a cross-sectional configuration of a panel receiving member, an LED, and an LED board included in a liquid crystal display device according to a tenth embodiment of the present invention.

As illustrated in FIG. 27, the liquid crystal panel 911 according to this embodiment is sandwiched and retained between a frame 913 on the front side and the panel receiving member 37 on the rear side. The liquid crystal panel 911 that is assembled together with the frame 913 and the panel receiving member 37 is attached to a back light unit 912. A chassis 914 included in the backlight unit 912 includes a bottom plate 38 that extends parallel to a plate surface of a light guide plate 916 and aside plate 39 that rises from ends of the bottom plate 38. On an inner surface of the side plate 39, an LED board 918 is disposed. The LED unit LU according to this embodiment includes an LED 917 and the LED board 918 and does not include the heat dissipation member 19 included in the first embodiment. A light guide reflection sheet 920 of the light guide plate 916 has an extended portion that is positioned between the LED board 918 and the bottom plate 38 of the chassis 914. On a surface of the panel receiving member 37 that faces the rear side, a reflection sheet 40 is disposed so as to face the extended portion of the light guide reflection sheet 920.

Figure 28:
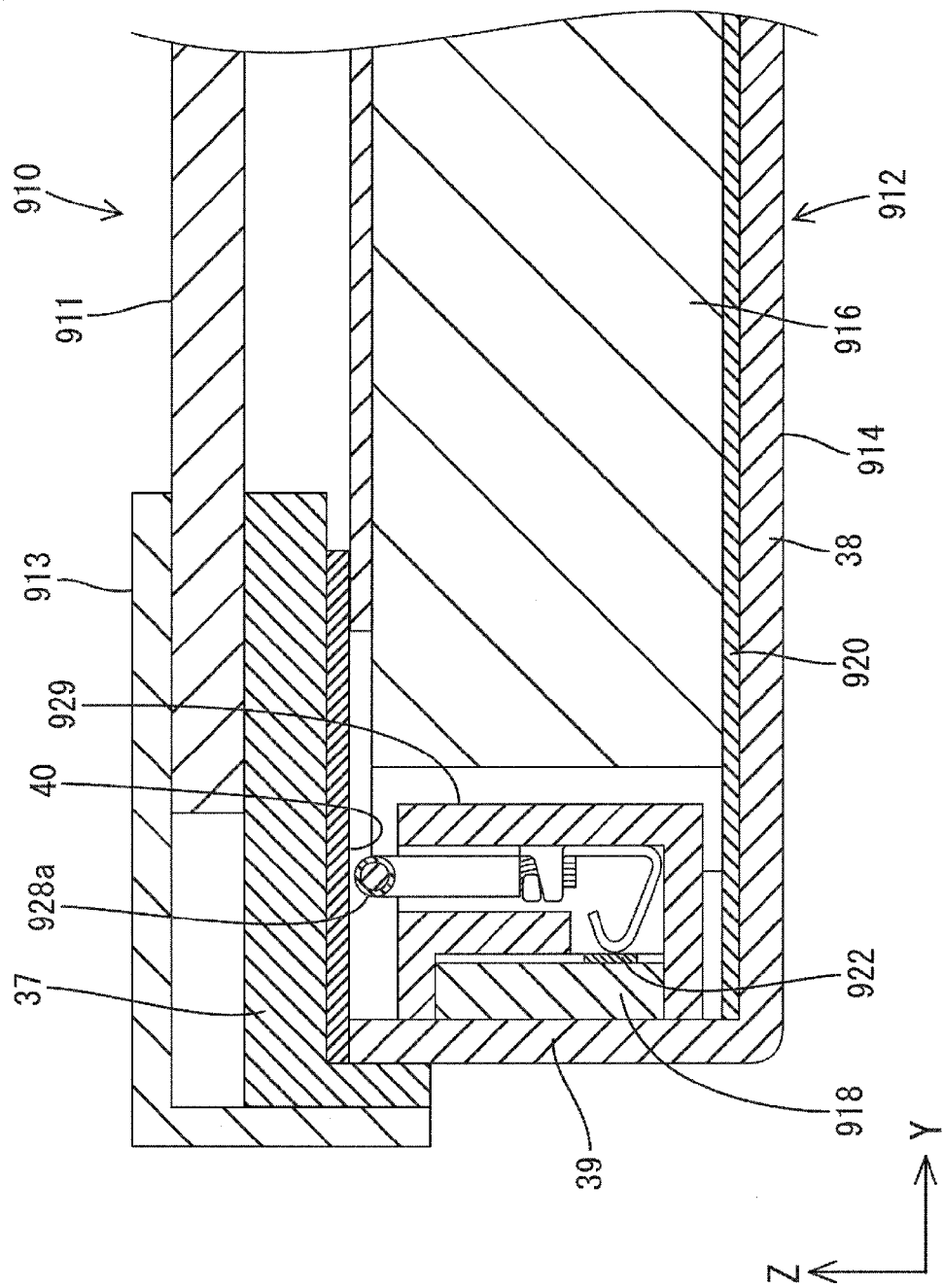
FIG. 28 is a cross-sectional view illustrating a cross-sectional configuration of a panel receiving member, an LED board, and a relay member connector.

As illustrated in FIG. 28, board relay terminals 922 are arranged such that a relay member connector 929 that is orientated to either side in the thickness direction of the light guide plate 916 can be connected. The board relay terminal 922 has the same configuration as that of the first embodiment and will not be described in detail. The relay member connectors 929 are connected while all being orientated to the same direction such that the covered wire 928a thereof is led out to the front side (the frame 913 side). In the liquid crystal display device 910 according to this embodiment, the liquid crystal panel 911 that is assembled together with the frame 913 and the panel receiving member 37 is attached to the back light unit 912 from the front side, and thus the components of the backlight unit 912 are also attached to the chassis 914 from the front side. In the connecting operation of the relay member connector 929, the relay member connector 929 is connected to the board relay terminals 922 of the LED board 918, which is placed in the chassis 914 in advance, from the front side in the Z-axis direction. In this configuration, the LED boards 918 can have the same configuration, and thus only one kind of the LED board 918 needs to be provided.

Other Embodiments

The present invention is not limited to the embodiments described in the above description with reference to the drawings. The following embodiments may be included in the technical scope of the present invention, for example.

(1) Other than the above embodiments, an arrangement of the board relay terminals and the relay member terminal fittings may be suitably changed.

(2) Other than the above embodiments, the number of board relay terminals and the number of relay member terminal fittings may be suitably changed. For example, the number of board relay terminals and relay member terminal fittings may be three or more.

(3) In the above second to fifth embodiments, the LED board includes the fitting recess and the relay member connecter includes the fitting protrusion as the projection and recess joint. However, the LED board may include the fitting protrusion and the relay member connector may include the fitting recess as the projection and recess joint.

(4) In the above second to fifth embodiments, one or two projection and recess joints are provided. However, three or more projection and recess joints may be provided. An arrangement of the projection and recess joints may be suitably changed. For example, one of the projection and recess joints may be positioned away from the rotation center of the relay member connector.

(5) In the second to fifth embodiments, if the projection and recess joint provides sufficient retention, the relay member connector may not include the retainers.

(6) Other than the above embodiments, a specific structure of the relay member terminal fitting included in the relay member connector may be suitably changed.

(7) In the above embodiments, the board relay terminals are provided on the mount surface of the LED board on which the LEDs are mounted. However, according to the present invention, the board relay terminals may be provided on a plate surface opposite to the mount surface of the LED board on which the LEDs are mounted.

(8) In the above embodiments, the sub frame made of synthetic resin is attached to the frame made of metal. However, the frame may integrally include a structure of the sub frame (a light guide plate support member), and the sub frame may be eliminated. In such a case, the frame may be made of metal so as to have sufficient strength.

(9) Other than the above embodiments, the specific arrangement and the number of the LED boards may be suitably changed. For example, the LED boards may be arranged so as to face any three sides or all four sides of the light guide plate. In such a case, the number of LED boards arranged on each side of the light guide plate may be separately selected from one or two.

(10) In the above embodiments, the relay wiring member includes multiple covered wires. However, according to the present invention, the relay wiring member may include a flexible flat conductive body such as a flexible flat cable (FFC).

(11) In the above embodiments, the relay wiring member including the covered wires is used as the relay member connected to the board relay terminal. However, a printed-wiring board may be used as the relay member.

(12) In the above embodiments, the frame and the chassis are exterior members that provide an outer appearance of the liquid crystal display device. However, according to the present invention, a separate exterior member that covers a rear surface of the chassis may be provided such that the chassis is not exposed to the outside. Alternatively, a separate exterior member that covers both of the frame and the chassis may be provided such that the frame and the chassis are not exposed to the outside.

(13) In the above embodiments, the chassis and the frame that are the exterior members are made of metal. However, one or both of the chassis and the frame may be made of synthetic resin. This configuration is preferably applied to a medium-size or small-size liquid crystal display device that does not require very high mechanical strength.

(14) In the above embodiments, the power source board is configured to supply the power to the LED. However, an LED drive board that is configured to supply the power to the LED may be provided as a separate member from the power source board.

(15) In the above embodiments, the main board includes the tuner. However, a tuner board including a tuner may be provided as a separate member from the main board.

(16) In the above embodiments, the color filter of the liquid crystal panel includes color portions in three colors, red, green, and blue. However, the color filter may include color portions in four or more colors.

(17) In the above embodiments, the LED is used as a light source. However, a light source other than the LED, such as an organic EL, may be used.

(18) In the above embodiments, TFTs are used as switching components of the liquid crystal display device. However, the technology described above can be applied to liquid crystal display devices including switching components other than TFTs (e.g. thin film diode (TFD)). The technology can be applied to not only color liquid crystal display devices but also black-and-white liquid crystal display devices.

(19) In the above embodiments, the liquid crystal display device including the liquid crystal panel as a display panel is used. However, the technology can be applied to display devices including other types of display panels.

(20) In the above embodiments, the television device including the tuner is used. However, the technology can be applied to a display device without a tuner.

EXPLANATION OF SYMBOLS

10, 910: liquid crystal display device (display device), 11, 911: liquid crystal panel (display panel), 12, 912: backlight unit (lighting device), 14, 914: chassis, 16, 516, 616, 716, 816, 916: light guide plate, 16a: light exit surface, 16b, 516b: light entrance surface, 17, 517, 917: LED (light source), 18, 118, 218, 318, 418, 518, 618, 718, 818, 918: LED board (light source board), 18a: mount surface (plate surface), 22, 322, 422, 922: board relay terminal, 28, 528: relay wiring member (relay member), 31: relay wiring member through recess (relay member through recess), 33, 133: retainer, 34, 234, 334, 434: projection and recess joint, C: rotation center, CL1, CL2: center line, LS: line segment, PWB: power source board (power source), TV: television device

The invention claimed is:

1. A lighting device comprising:
   a light source;
   a light guide plate including a light entrance surface and a light exit surface, the light entrance surface facing the light source and through which light emitted from the light source enters the light guide plate, the light exit surface through which the light in the light guide plate exits;
   a plurality of light source boards each including a plate surface facing the light entrance surface and board relay terminals configured to relay power to the light source, the plate surface on which the light source is mounted; and
   a relay member electrically connecting between the board relay terminals and a power, wherein
   the board relay terminals are arranged such that the relay member that is orientated to either one of sides in the thickness direction of the light guide plate is allowed to be connected to the board relay terminals.

2. The lighting device according to claim 1, wherein the board relay terminals are arranged on the plate surface of the light source board so as to be symmetric with respect to a rotation center of the relay member.

3. The lighting device according to claim 2, wherein
   the relay member includes a plurality of relay members, and
   the board relay terminals are connected to the relay members all oriented to one side in the thickness direction of the light guide plate.

4. The lighting device according to claim 2, wherein the board relay terminals included in each light source board are arranged such that a line segment connecting the board relay terminals is inclined with respect to the thickness direction of the light guide plate.

5. The lighting device according to claim 1, wherein
   the relay member includes a pair of retainers, and
   the light source board is sandwiched between the retainers from front and rear sides of the light guide plate.

6. The lighting device according to claim 1, wherein the plate surface of the light source board and a surface of the relay member facing the light source board include a projection and recess joint, the projection and recess joint including a protrusion and a recess fitting each other.

7. The lighting device according to claim 6, wherein the projection and recess joint includes a plurality of projection and recess joints and the projection and recess joints are provided in the plate surface of the light source board.

8. The lighting device according to claim 1, wherein
   the board relay terminals are located on an end of each of the light source boards, and
   at least two of the light source boards are arranged symmetric with respect to a center line of the light guide plate, the center line extending along one of sides of the light guide plate.

9. The lighting device according to claim 8, wherein
   at least two of the light source boards are arranged along a side of the light guide plate, and
   the light source boards each include the board relay terminals on the end of the light source board in a direction along the side of the light guide plate.

10. The lighting device according to claim 8, wherein
    at least two of the light source boards are arranged on opposite sides of the light guide plate such that the light guide plate is disposed therebetween in a direction along a side of the light guide plate, and
    the board relay terminals of one of the light source boards face the board relay terminals of another one of the light source boards with the light guide plate therebetween.

11. The lighting device according to claim 1, wherein
    the light source board includes the board relay terminals on the plate surface thereof on which the light source is mounted, and
    the light guide plate includes a relay member through recess, the relay member through recess is a cutout through which the relay member connected to the board relay terminals passes.

12. The lighting device according to claim 11, wherein the relay member through recess is the cutout at a corner of the light guide plate.

13. The lighting device according to claim 1, further includes a chassis housing the light source board and the light guide plate, the chassis is arranged such that a surface thereof facing the light guide plate and the light source board is located on a side opposite to the light exit surface, the power being arranged outside the chassis, wherein
    the relay member is connected to the board relay terminals from a side of the chassis.

14. A display device comprising:
    the lighting device according to claim 1; and
    a display panel configured to provide display using light from the lighting device.

15. A television device comprising the display device according to claim 14.

* * * * *